US010093295B2

(12) United States Patent
Kim et al.

(10) Patent No.: US 10,093,295 B2
(45) Date of Patent: Oct. 9, 2018

(54) ELECTRIC BRAKE SYSTEM

(71) Applicant: MANDO CORPORATION, Gyeonggi-do (KR)

(72) Inventors: Hyun-Ho Kim, Gyeonggi-do (KR); In-Wook Jeon, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/261,864

(22) Filed: Sep. 9, 2016

(65) Prior Publication Data

US 2017/0072928 A1    Mar. 16, 2017

(30) Foreign Application Priority Data

Sep. 11, 2015   (KR) .......................... 10-2015-0128860

(51) Int. Cl.
| | |
|---|---|
| *B60T 8/40* | (2006.01) |
| *B60T 11/20* | (2006.01) |
| *B60T 7/04* | (2006.01) |
| *B60T 11/22* | (2006.01) |
| *B60T 13/74* | (2006.01) |
| *B60T 13/66* | (2006.01) |
| *B60T 13/68* | (2006.01) |
| *B60T 8/34* | (2006.01) |

(52) U.S. Cl.
CPC ............... *B60T 11/20* (2013.01); *B60T 7/042* (2013.01); *B60T 8/4081* (2013.01); *B60T 11/22* (2013.01); *B60T 13/662* (2013.01); *B60T 13/686* (2013.01); *B60T 13/745* (2013.01); *B60T 8/348* (2013.01); *B60T 8/4018* (2013.01); *B60T 2270/82* (2013.01)

(58) Field of Classification Search
CPC ........ B60T 7/042; B60T 8/348; B60T 8/4018; B60T 8/4081; B60T 11/20; B60T 11/22; B60T 16/662; B60T 13/686; B60T 2270/82

See application file for complete search history.

(56) References Cited

U.S. PATENT DOCUMENTS

| | | | | |
|---|---|---|---|---|
| 7,431,407 | B2 * | 10/2008 | Kamiya | B60T 8/3655 303/114.3 |
| 9,050,956 | B2 * | 6/2015 | Hotani | B60T 8/4081 |
| 9,321,444 | B2 * | 4/2016 | Ganzel | B60T 13/168 |
| 9,527,486 | B2 * | 12/2016 | Maruo | B60T 8/4081 |

(Continued)

FOREIGN PATENT DOCUMENTS

| | | |
|---|---|---|
| DE | 10 2012 205 860 | 10/2012 |
| EP | 2 520 473 | 11/2012 |
| KR | 10-2013-0104160 | 9/2013 |

*Primary Examiner* — Thomas W Irvin
(74) *Attorney, Agent, or Firm* — Ladas & Parry, LLP

(57) ABSTRACT

An electric brake system is disclosed. The electric brake system includes a master cylinder configured to discharge oil according to a pedal effort of a brake pedal, a simulation device provided with a simulator valve provided at a flow path connecting a simulation chamber, which is connected to the master cylinder to accommodate oil therein, to a first reservoir for storing oil therein so as to provide a reaction force according to the pedal effort of the brake pedal, and an inspection valve provided at a flow path connecting the first reservoir to the master cylinder or at a flow path connecting the master cylinder to the simulation device.

17 Claims, 22 Drawing Sheets

(56) References Cited

U.S. PATENT DOCUMENTS

| | | | | |
|---|---|---|---|---|
| 9,555,789 B2* | 1/2017 | Jeon | .................. | B60T 13/686 |
| 9,827,966 B2* | 11/2017 | Jeon | .................. | B60T 13/686 |
| 9,868,424 B2* | 1/2018 | Brenndoerfer | ........ | B60T 8/4081 |
| 2012/0193975 A1* | 8/2012 | Ishii | .................. | B60T 8/4081 |
| | | | | 303/14 |
| 2013/0147259 A1* | 6/2013 | Linkenbach | ............ | B60T 7/042 |
| | | | | 303/14 |
| 2014/0008965 A1* | 1/2014 | Ito | .................. | B60T 8/4081 |
| | | | | 303/3 |
| 2014/0028083 A1* | 1/2014 | Gerdes | .................. | B60T 1/10 |
| | | | | 303/6.01 |
| 2016/0159331 A1* | 6/2016 | Yang | .................. | B60T 13/142 |
| | | | | 303/15 |
| 2016/0185332 A1* | 6/2016 | Jeon | .................. | B60T 13/686 |
| | | | | 303/9.61 |
| 2017/0072919 A1* | 3/2017 | Jeon | .................. | B60T 8/4081 |
| 2017/0072927 A1* | 3/2017 | Jeon | .................. | B60T 11/20 |
| 2017/0072928 A1* | 3/2017 | Kim | .................. | B60T 8/4081 |
| 2017/0106843 A1* | 4/2017 | Jeong | .................. | B60T 8/90 |
| 2017/0106846 A1* | 4/2017 | Kim | .................. | B60T 8/348 |
| 2017/0144642 A1* | 5/2017 | Kim | .................. | B60T 7/042 |
| 2017/0144643 A1* | 5/2017 | Kim | .................. | B60T 7/042 |
| 2017/0144644 A1* | 5/2017 | Kim | .................. | B60T 13/146 |
| 2017/0158179 A1* | 6/2017 | Choi | .................. | B60T 7/042 |
| 2017/0158180 A1* | 6/2017 | Kim | .................. | B60T 7/042 |
| 2017/0158184 A1* | 6/2017 | Choi | .................. | B60T 17/221 |
| 2017/0210369 A1* | 7/2017 | Lim | .................. | B60T 7/042 |
| 2017/0282882 A1* | 10/2017 | Takahashi | .............. | B60T 15/00 |
| 2017/0334417 A1* | 11/2017 | Choi | .................. | B60T 13/68 |
| 2018/0118179 A1* | 5/2018 | Ko | .................. | B60T 8/404 |

* cited by examiner

[Fig. 1]
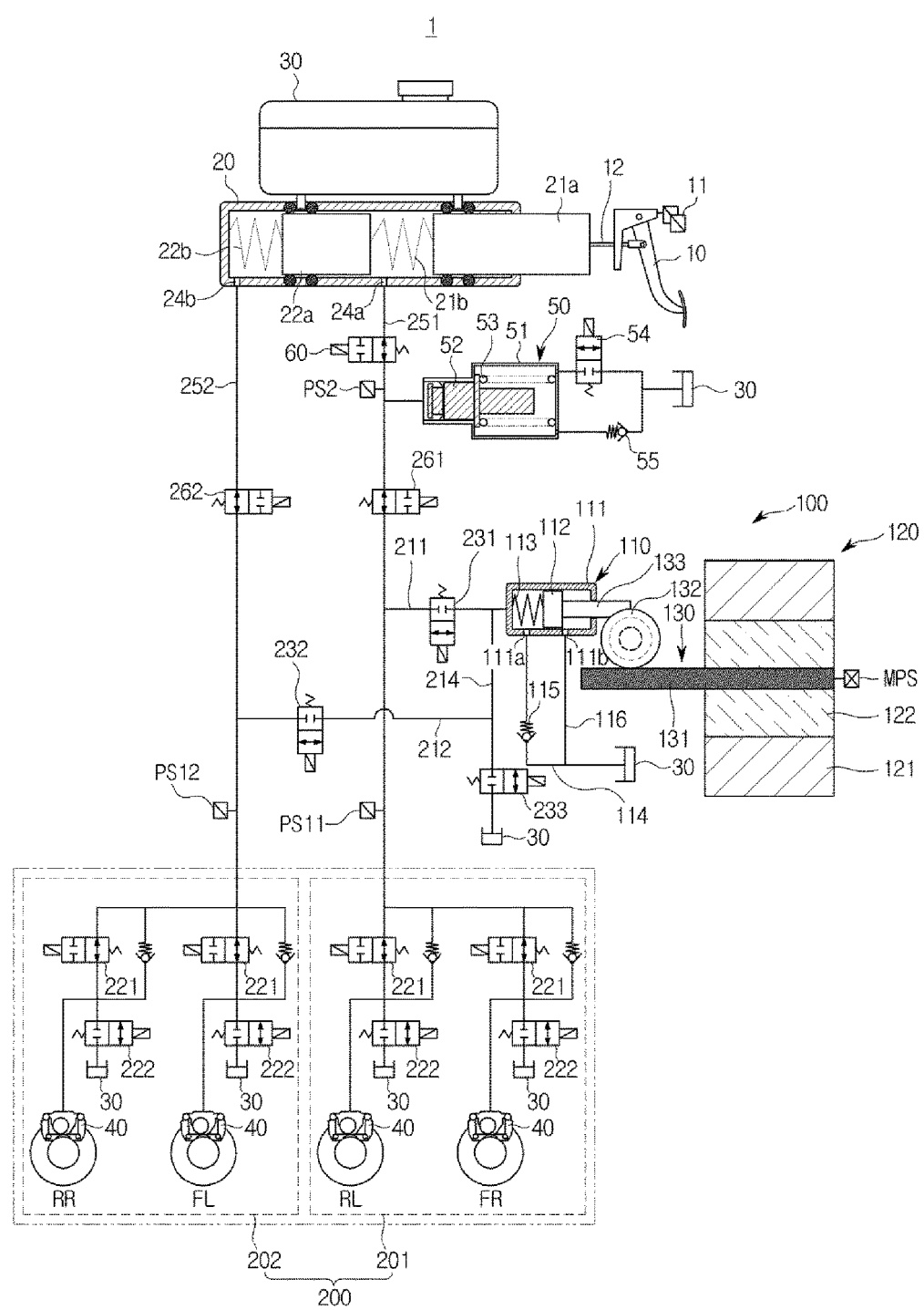

[Fig. 2]
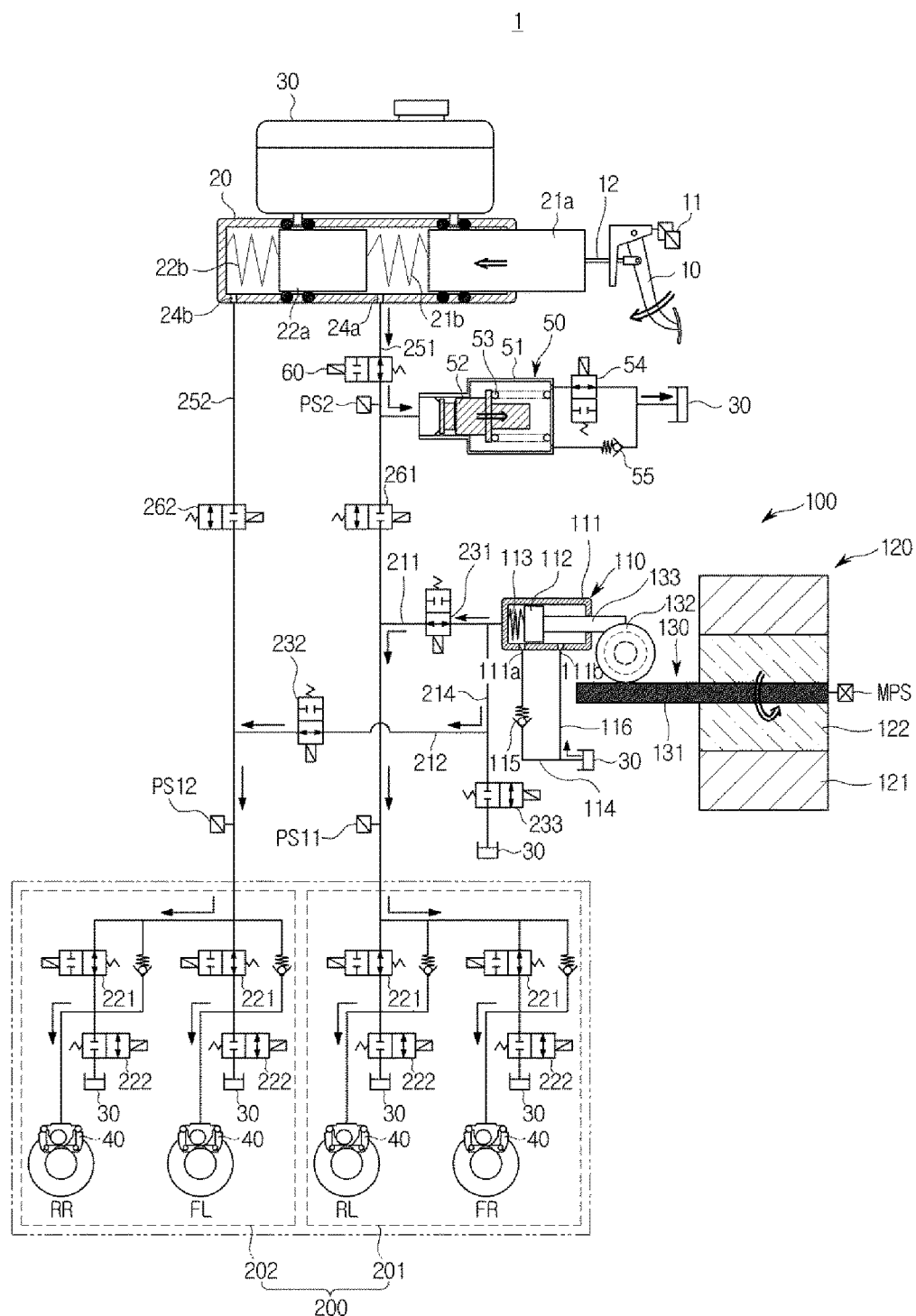

[Fig. 3]
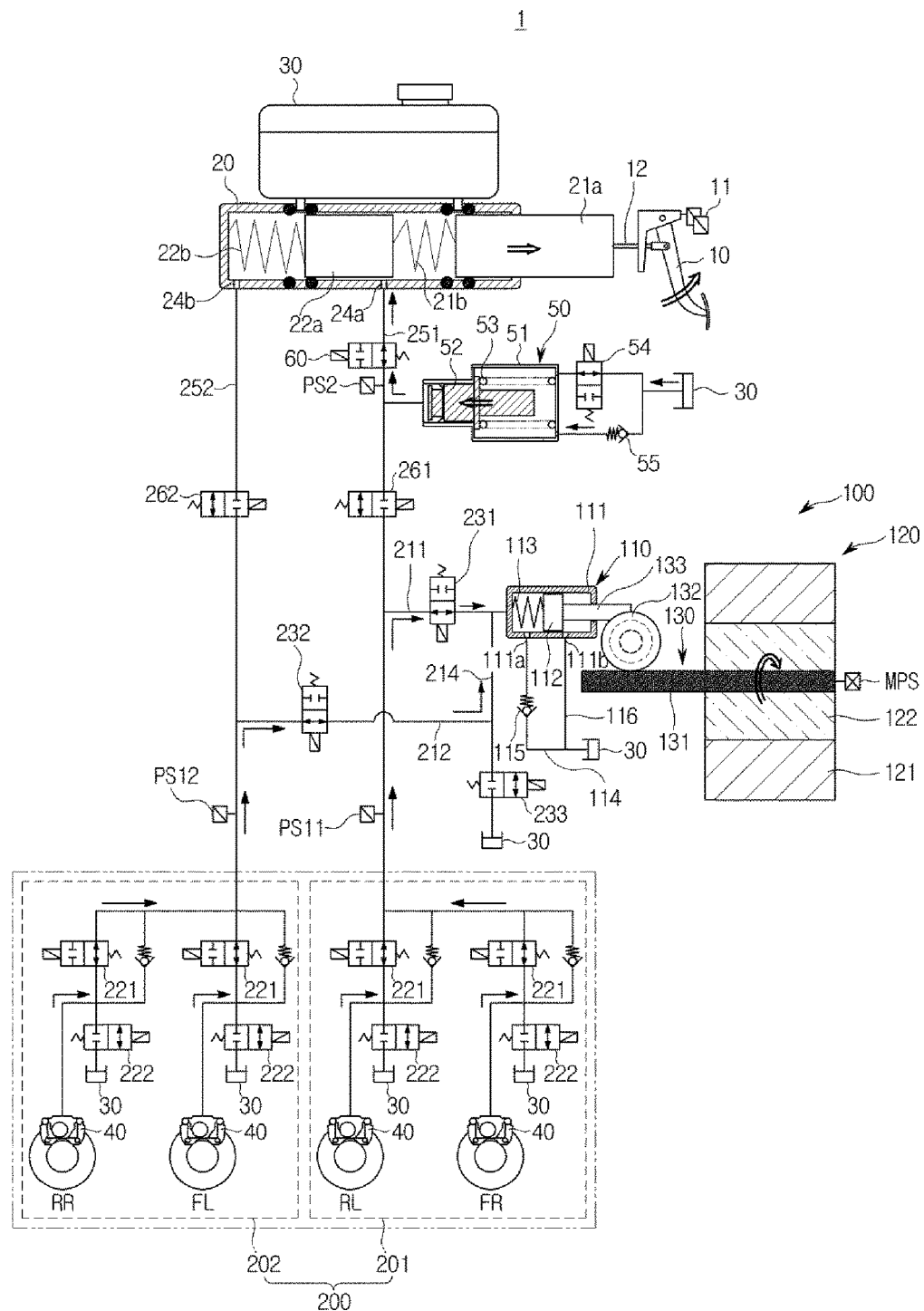

[Fig. 4]
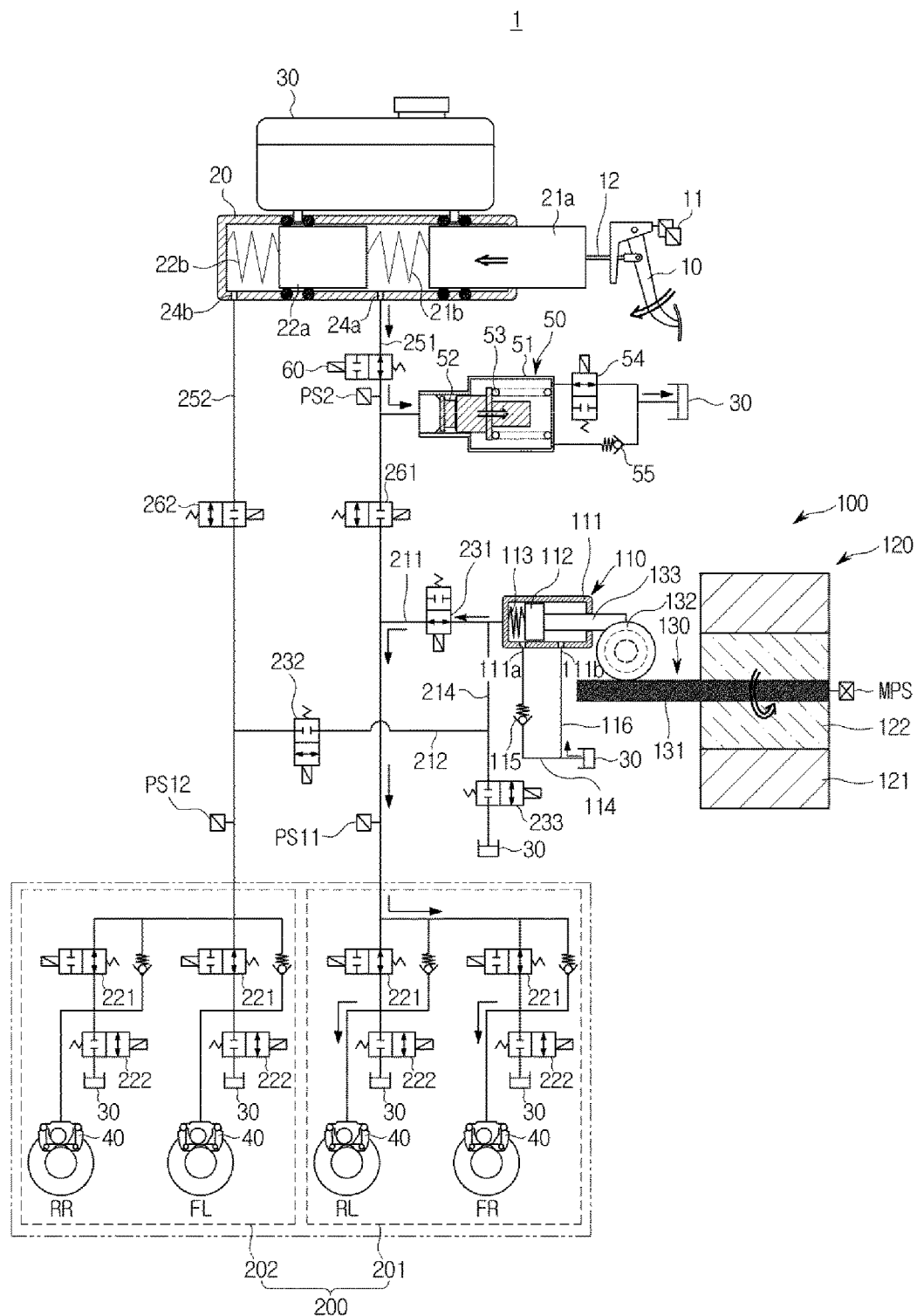

[Fig. 5]
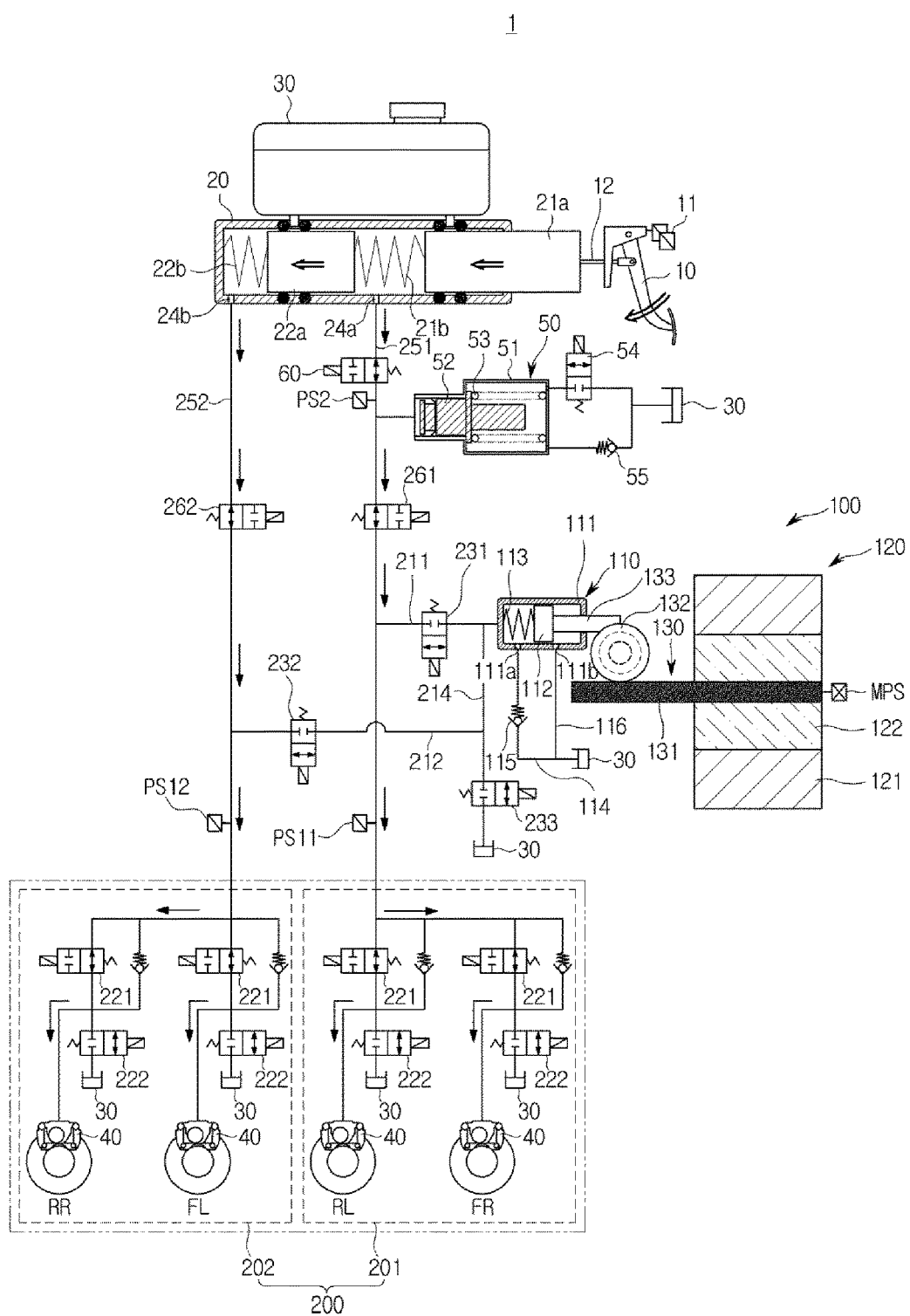

[Fig. 6]
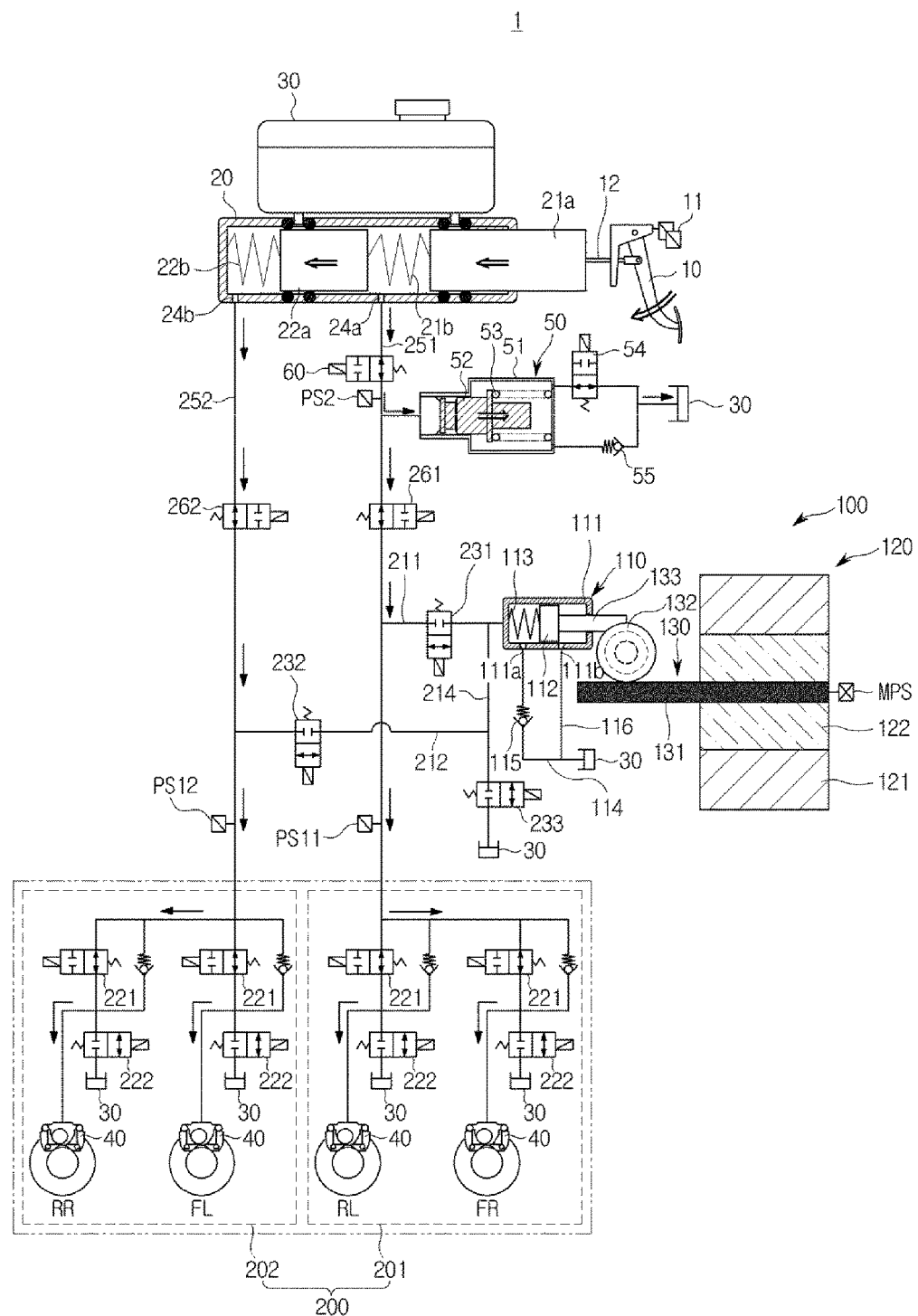

【Fig. 7】
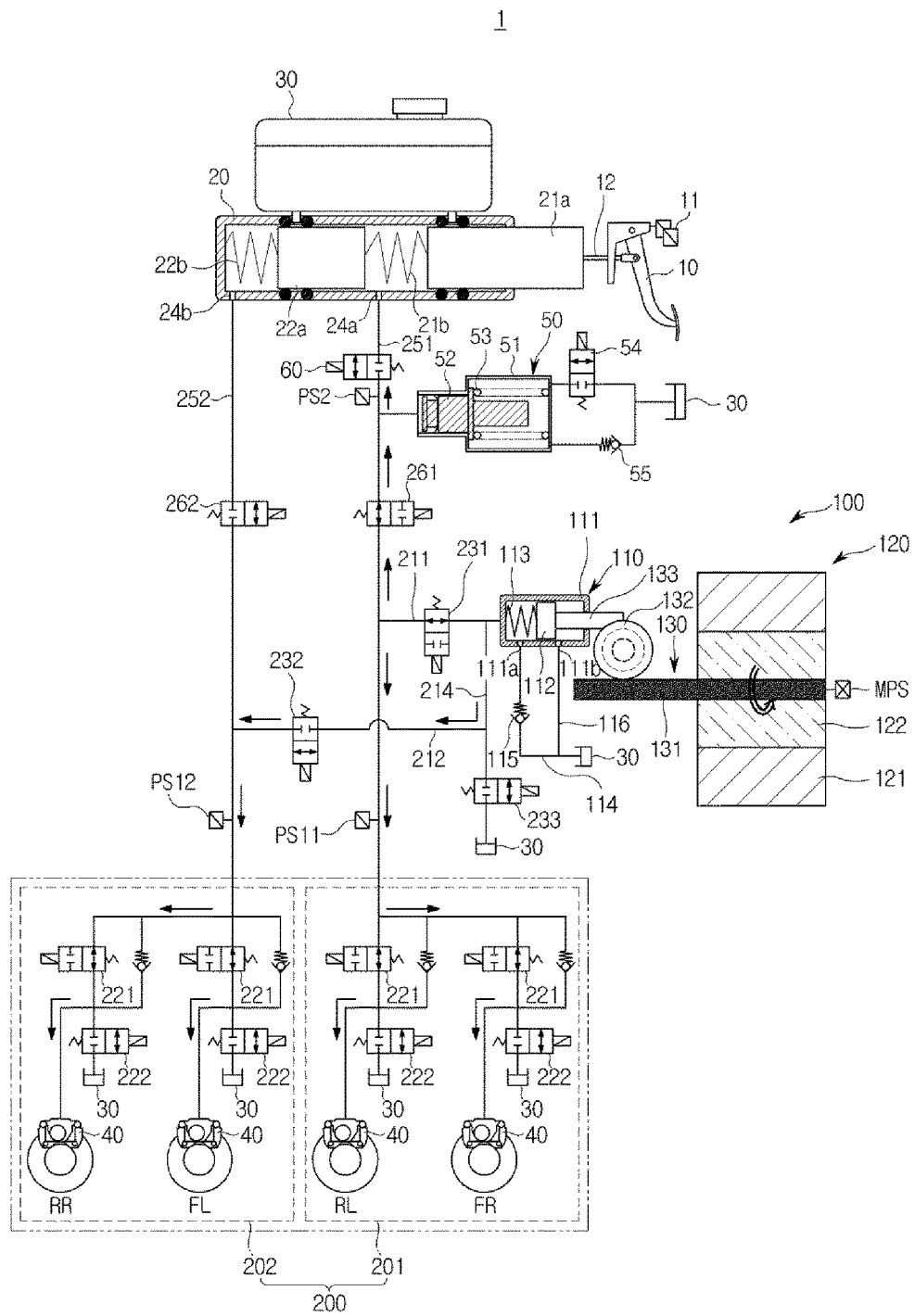

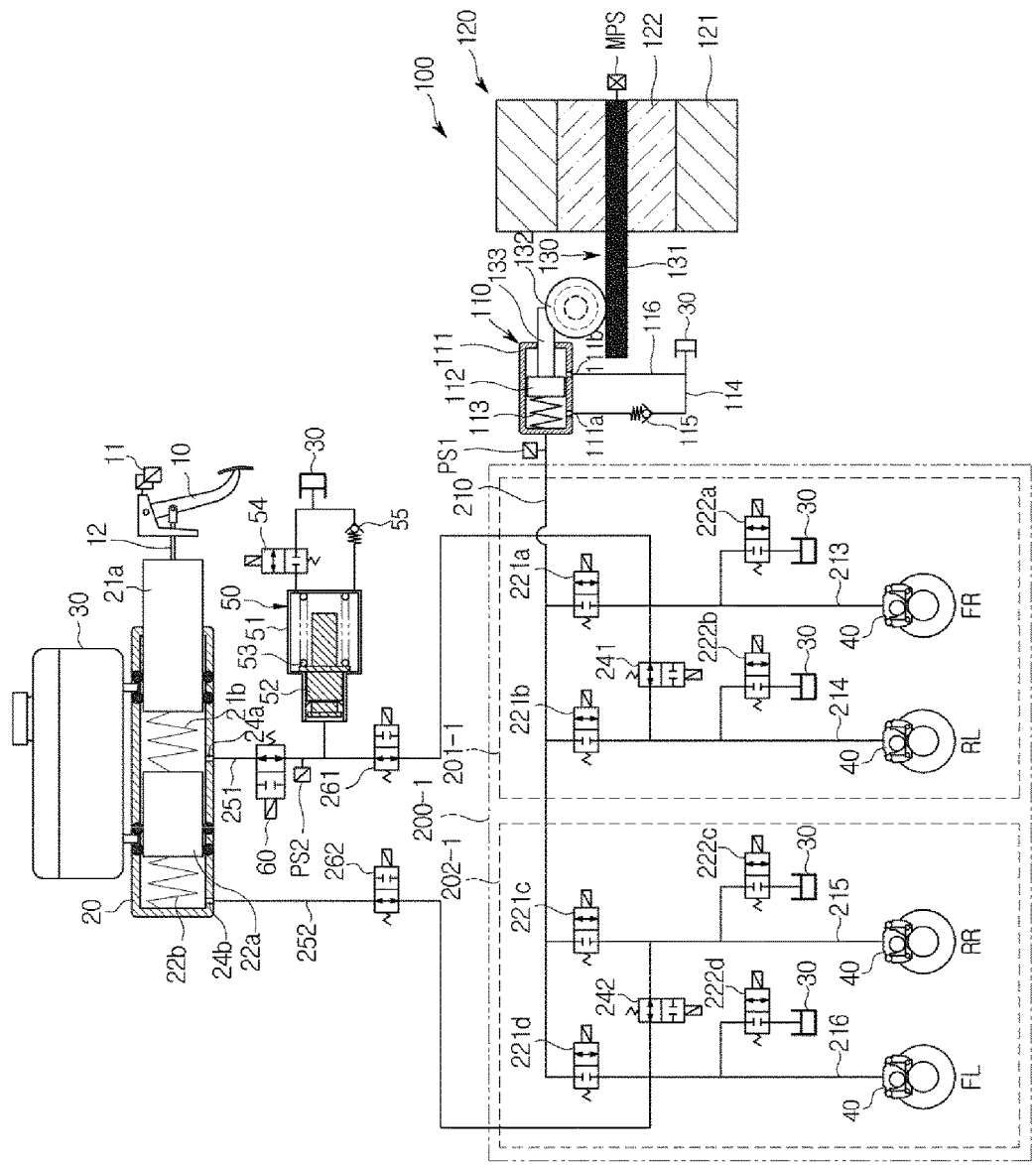
[Fig. 8]

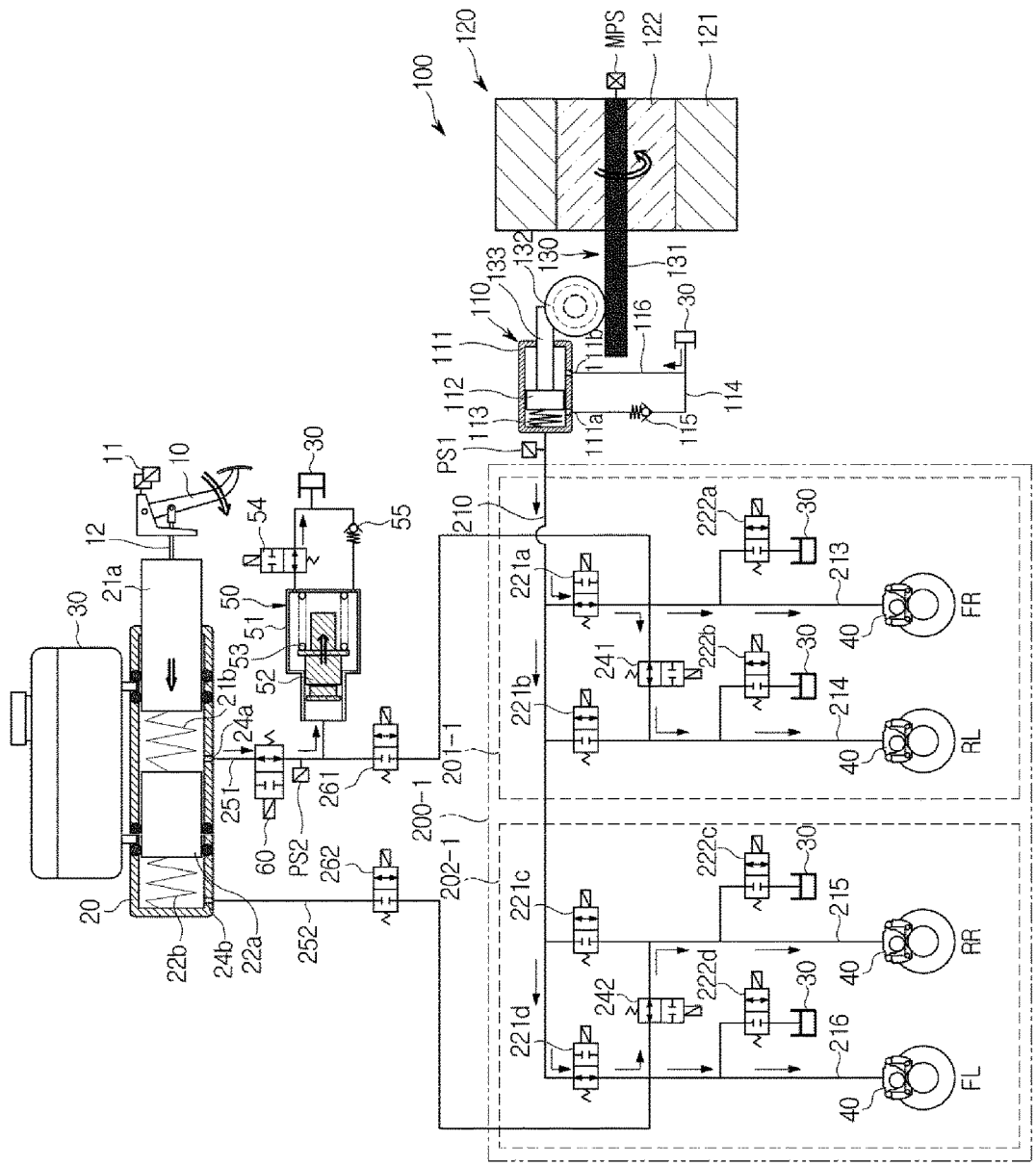
[Fig. 9]

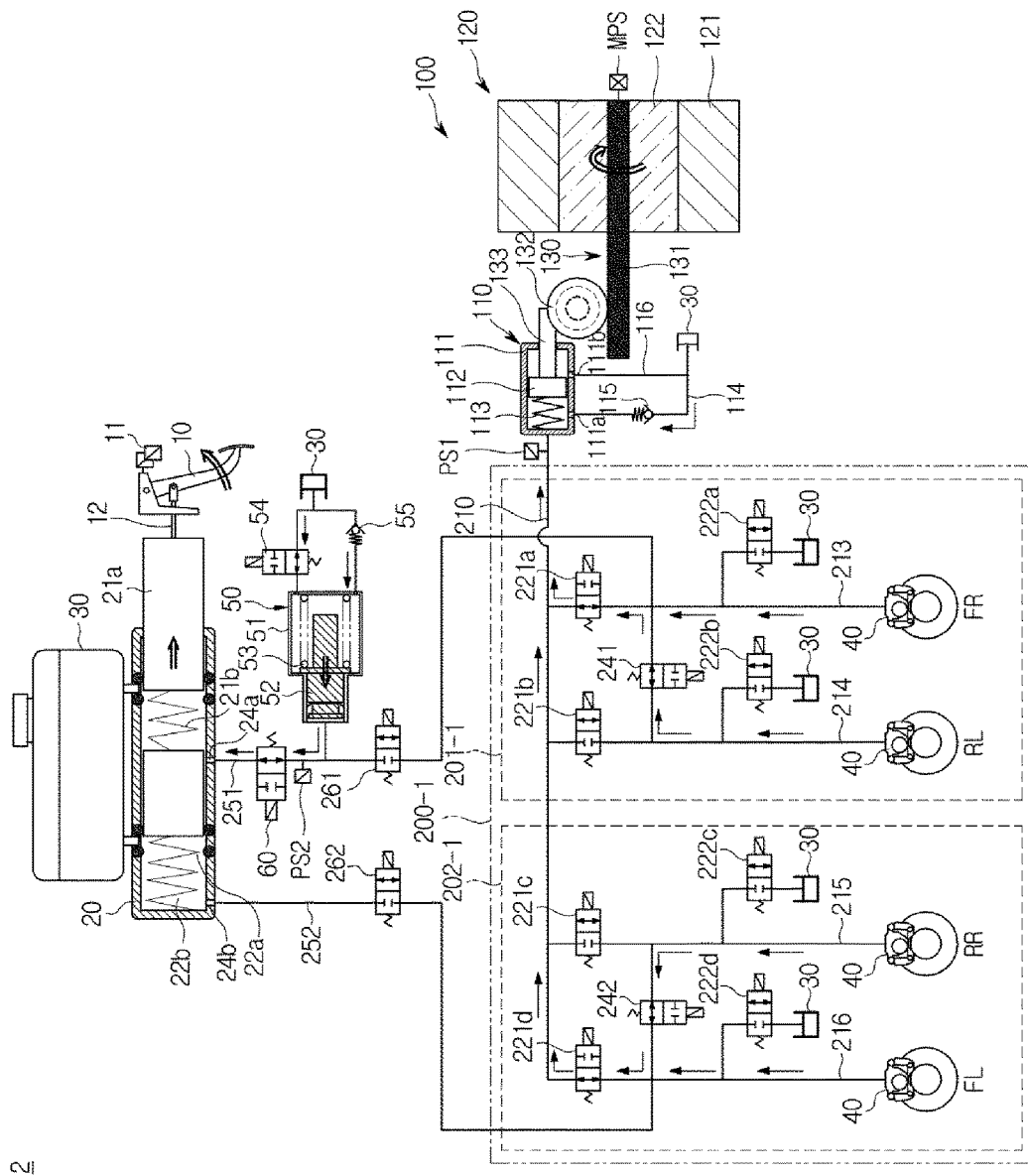
[Fig. 10]

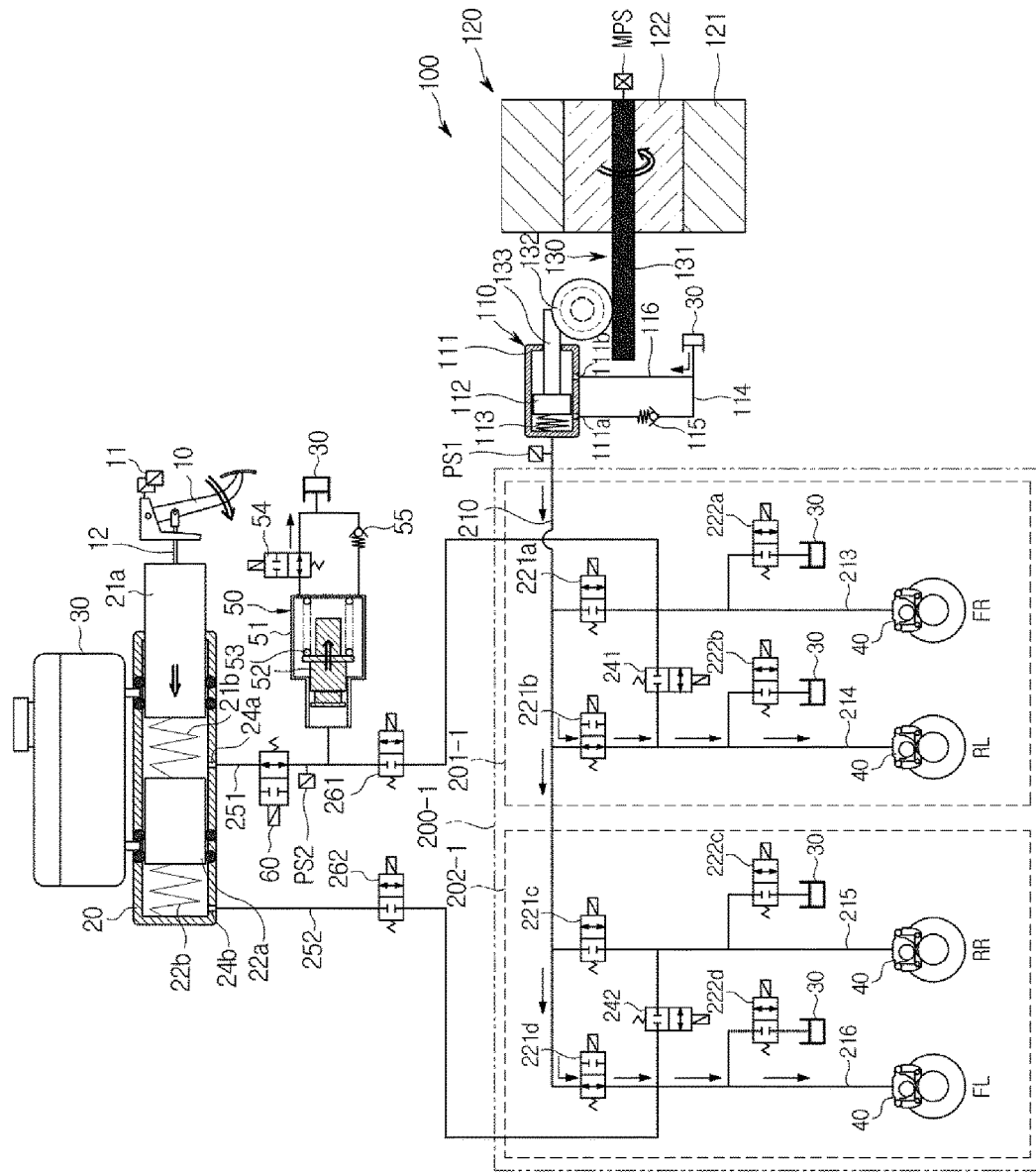
[Fig. 11]

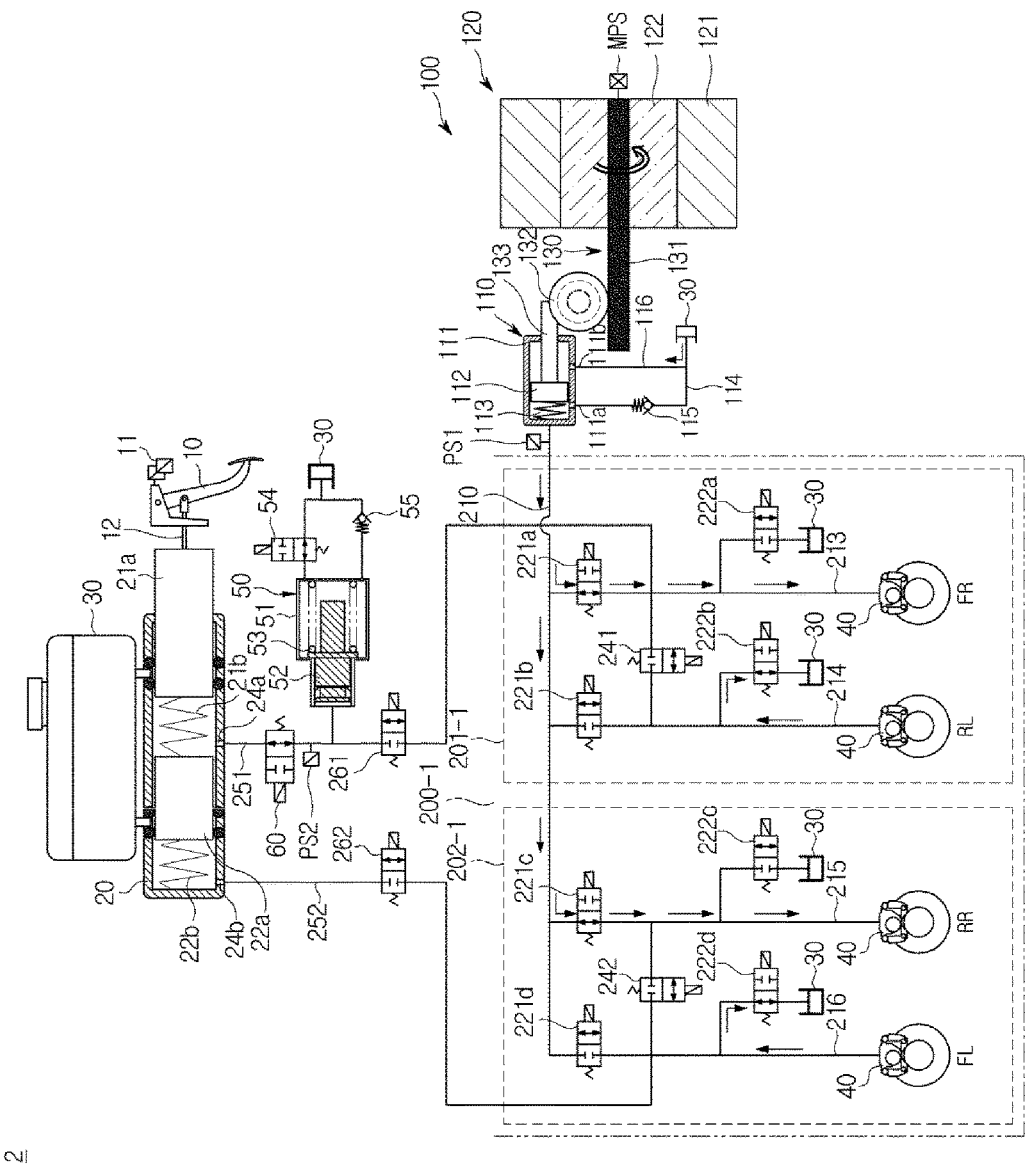
[Fig. 12]

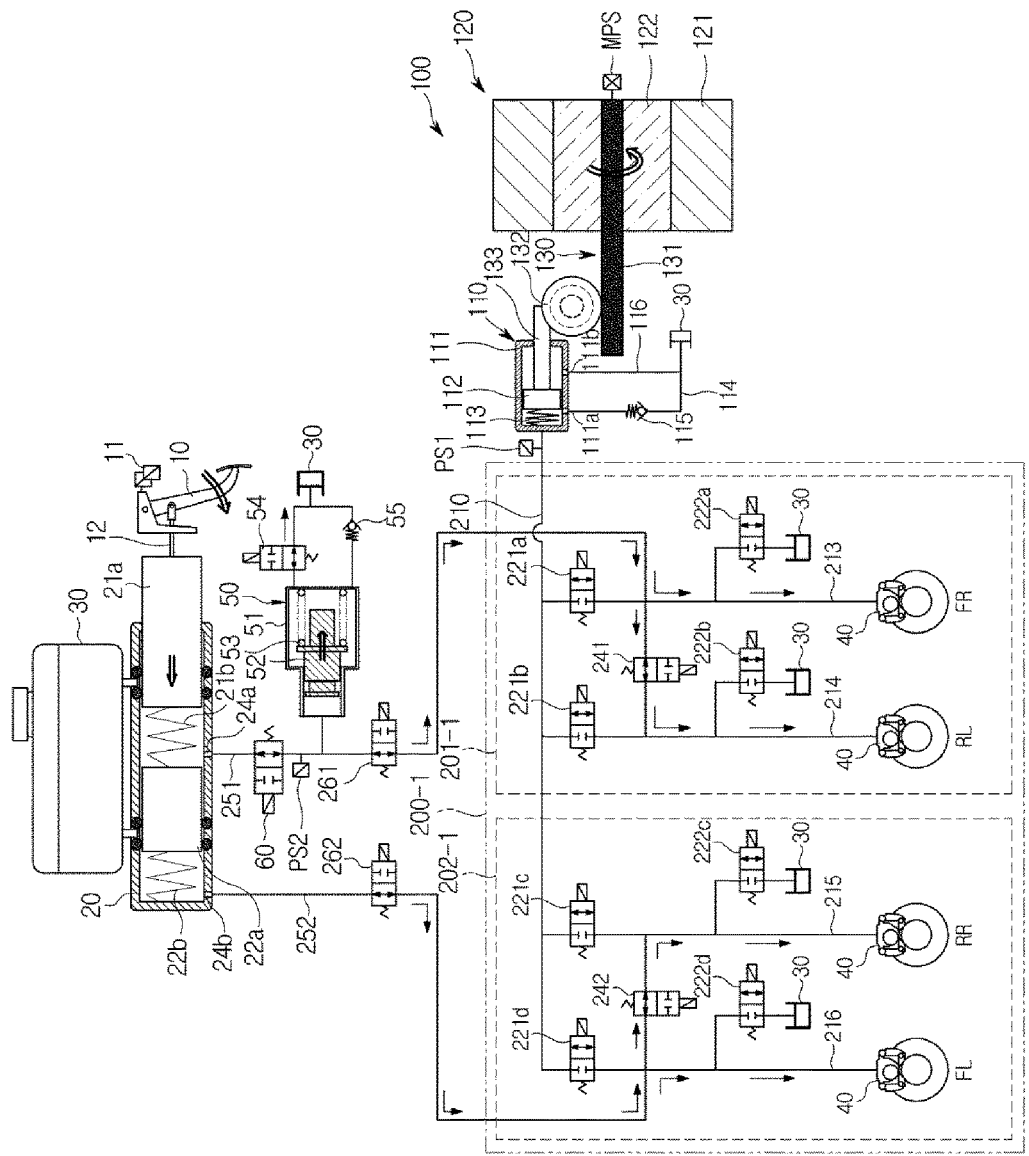
[Fig. 13]

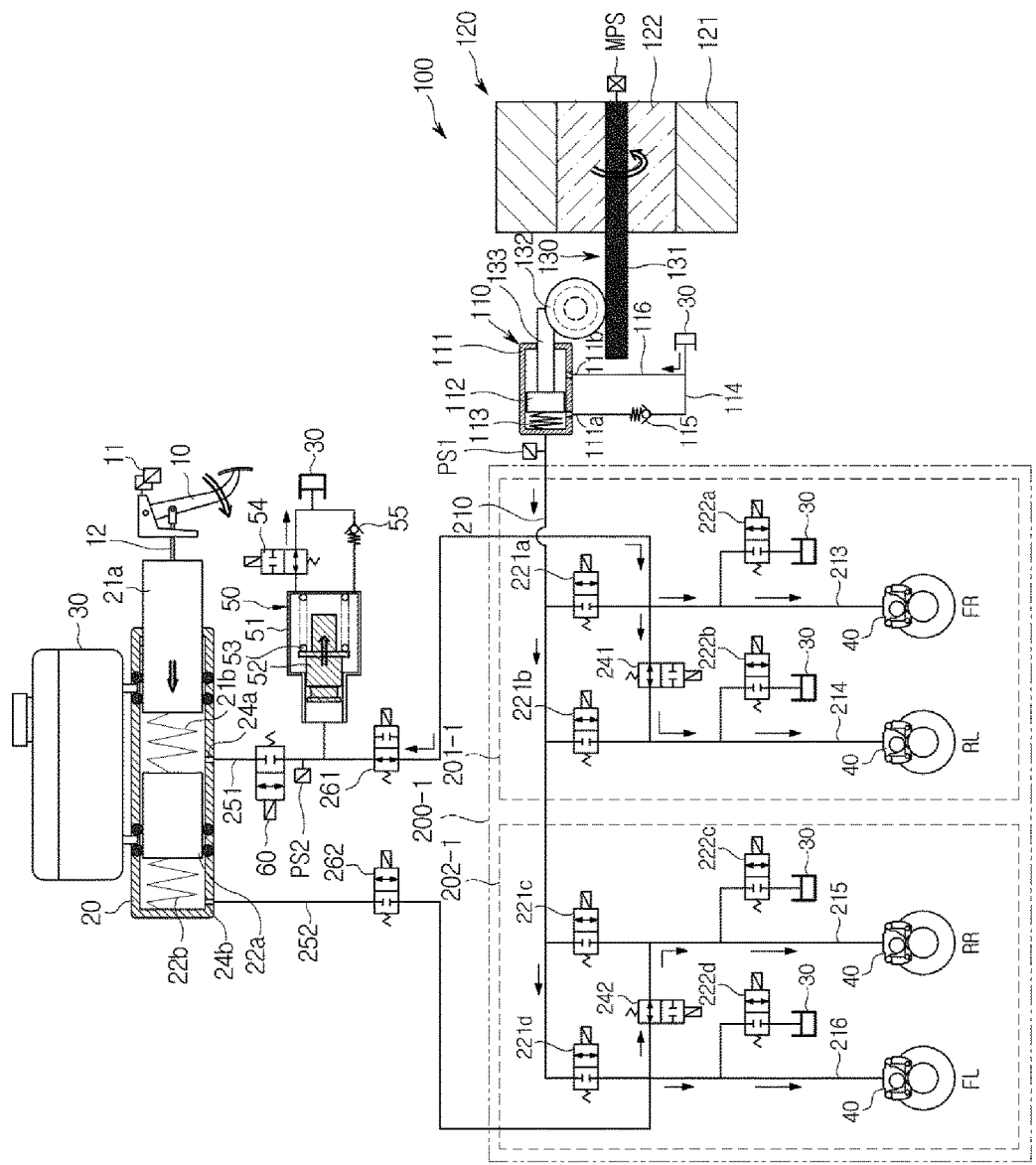
[Fig. 14]

[Fig. 15]
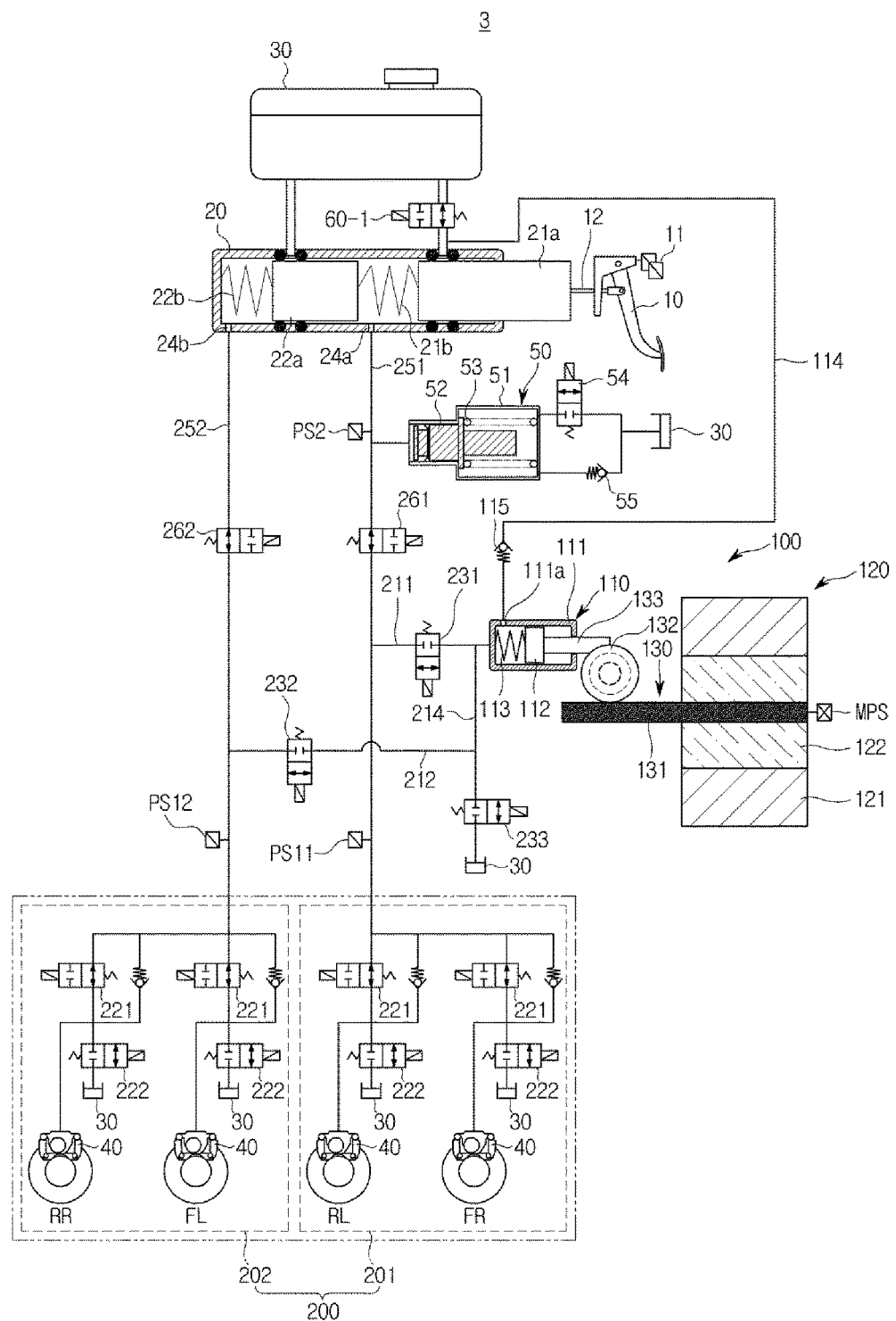

[Fig. 16]
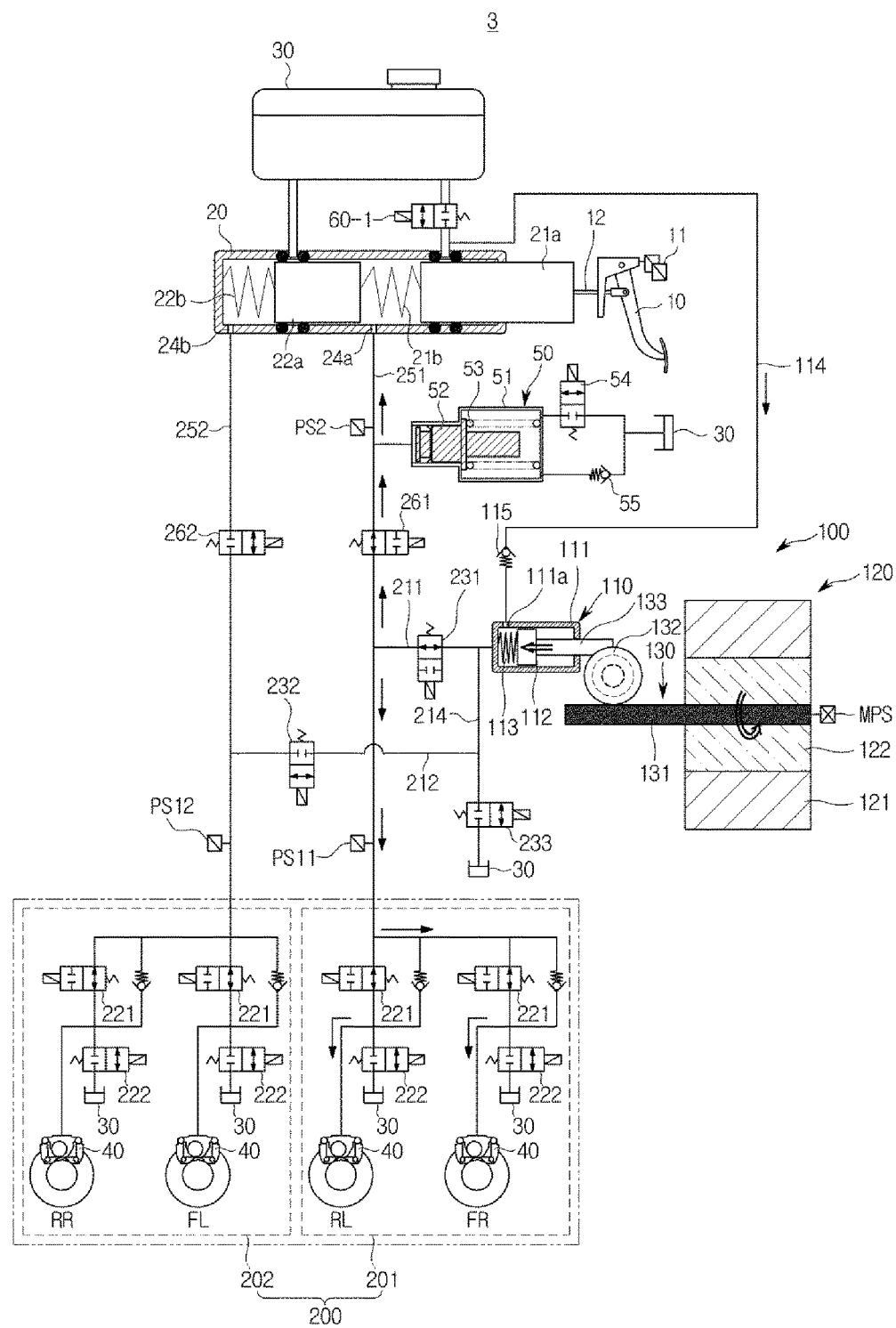

[Fig. 17]
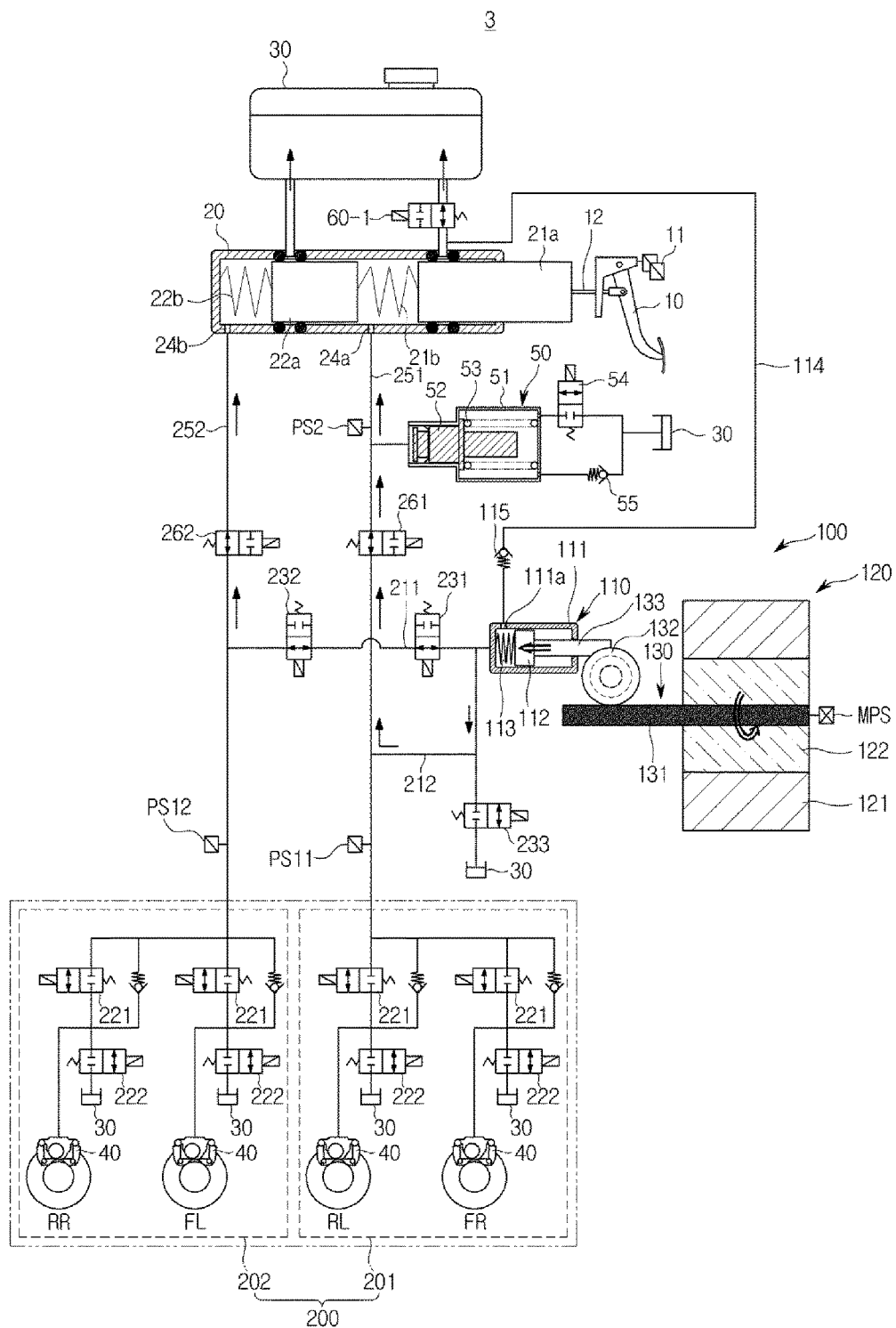

[Fig. 18]
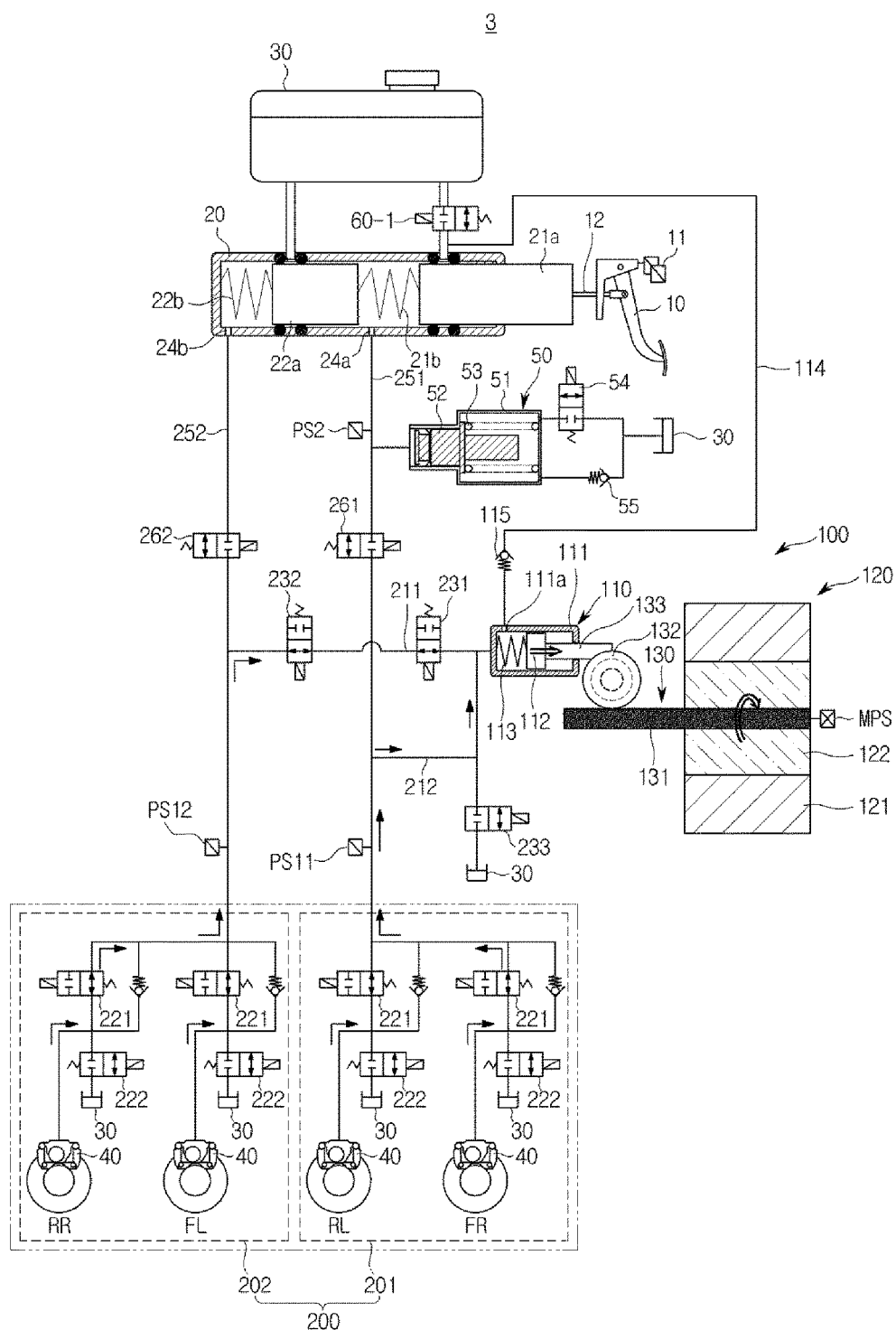

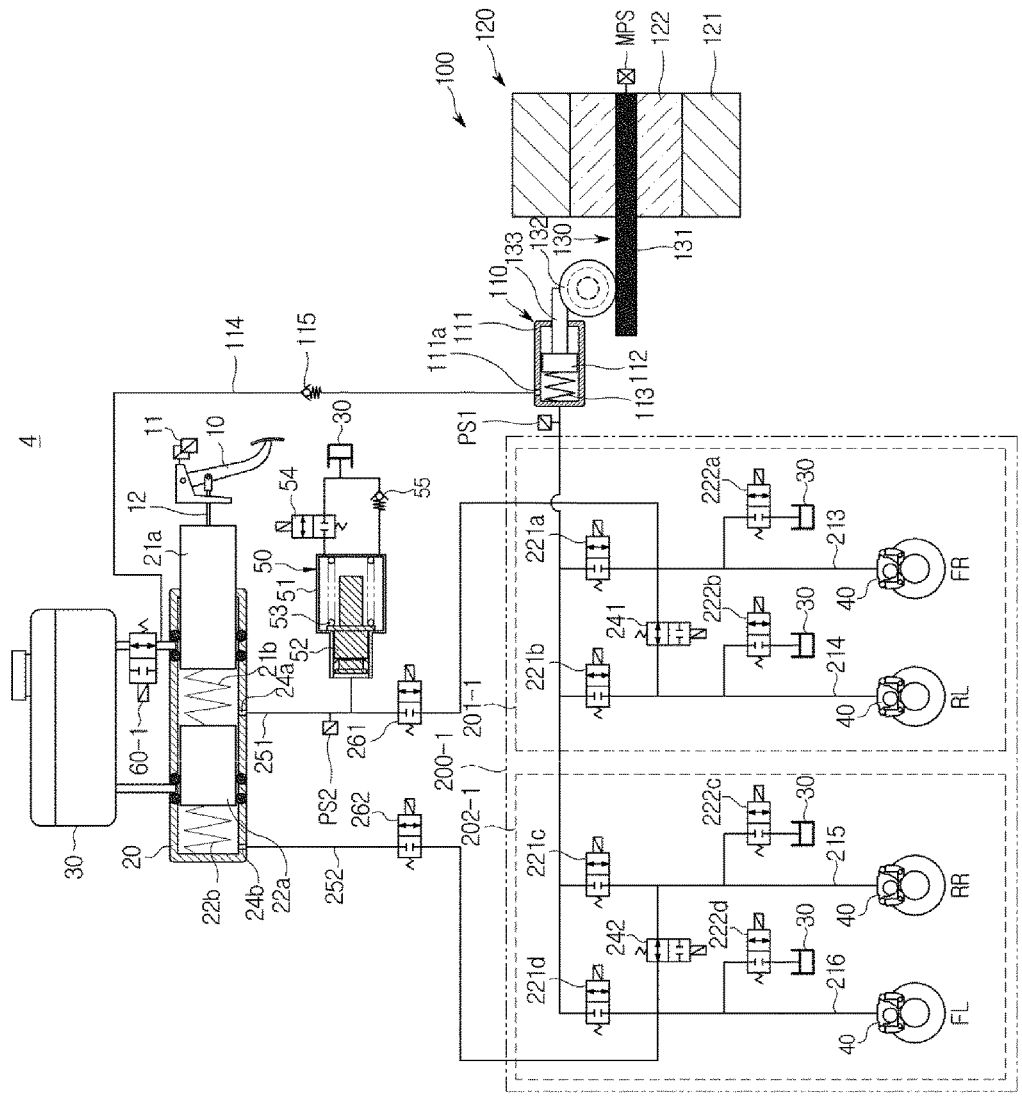
[Fig. 19]

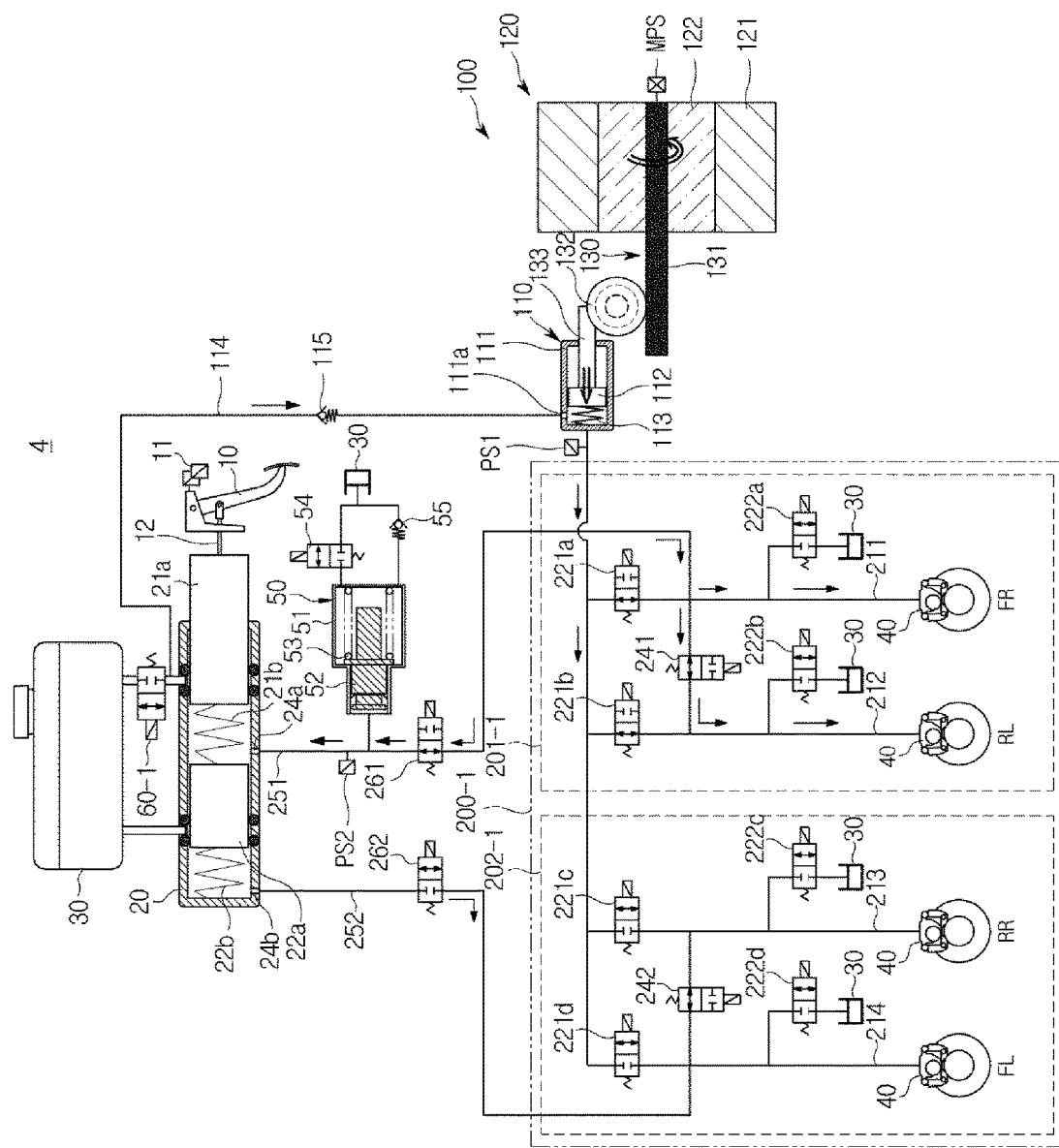
[Fig. 20]

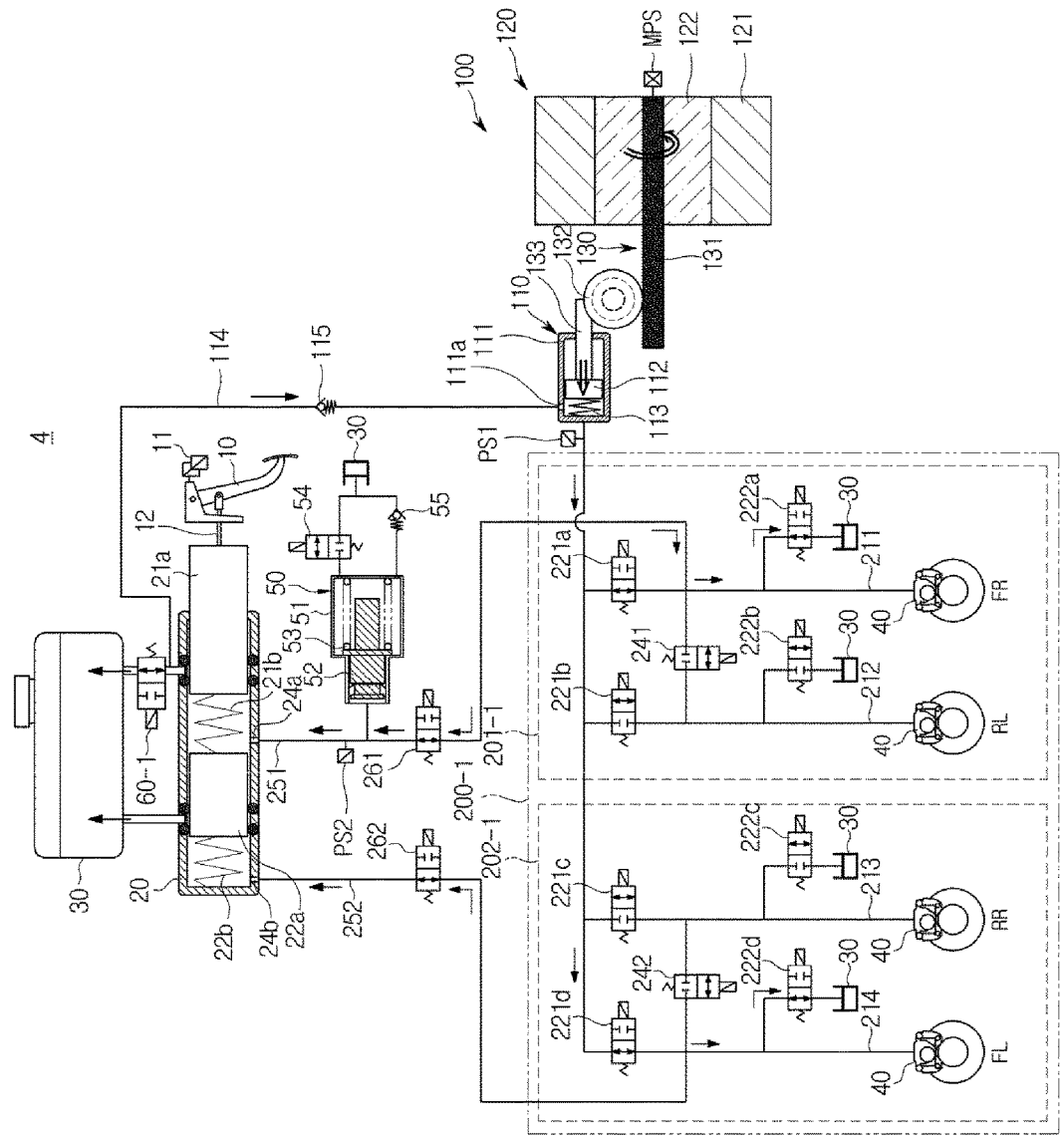
[Fig. 21]

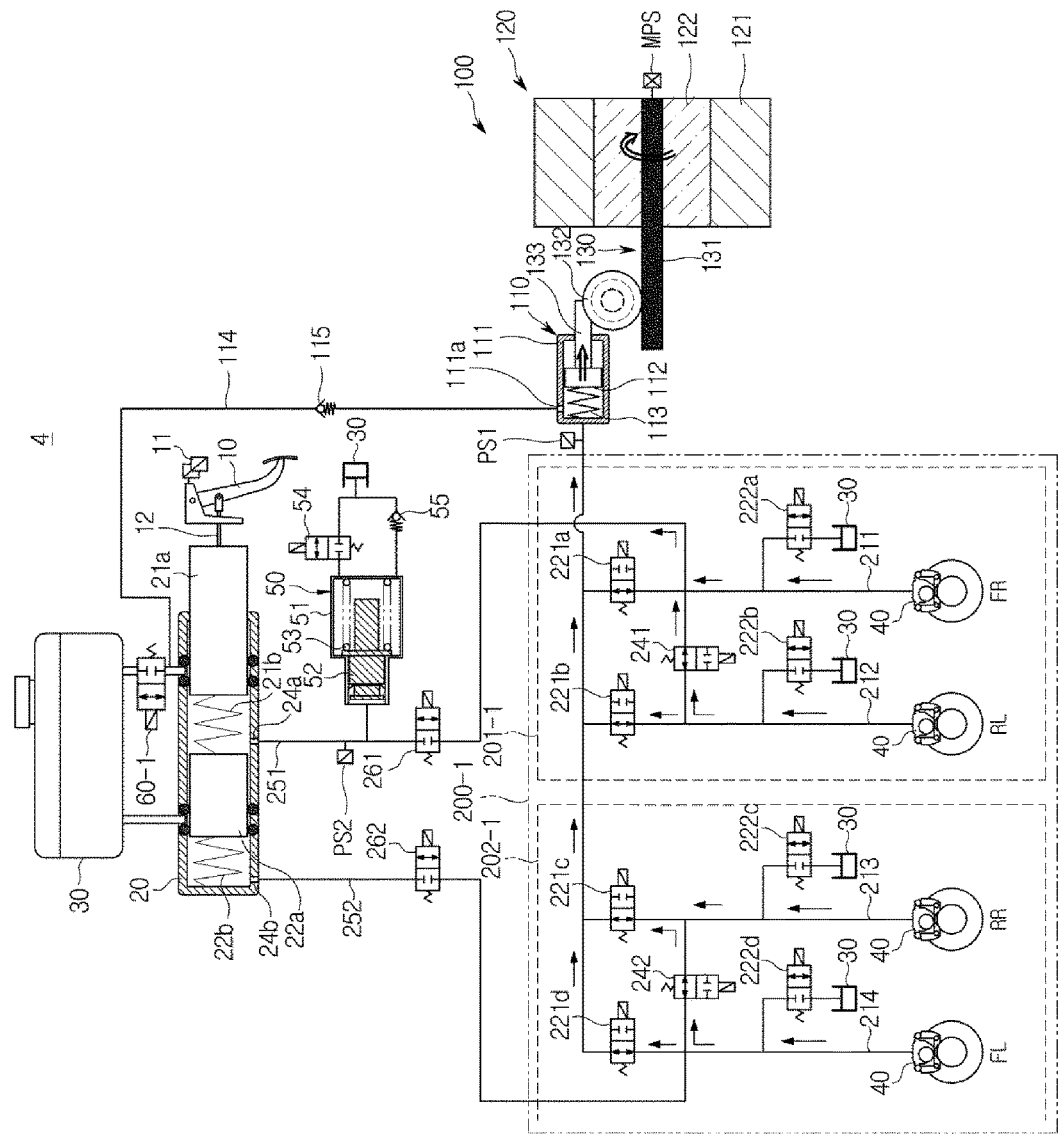
[Fig. 22]

ELECTRIC BRAKE SYSTEM

This application claims the benefit of Korean Patent Application No. 2015-0128860, filed on Sep. 11, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal, and a method capable of inspecting whether a leak of hydraulic pressure occurs using the same.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle is unintentionally rushed or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

Also, the electric brake system includes a simulation device capable of providing a driver with a reaction force according to the pedal effort of the brake pedal. At this point, the simulation device is connected to an oil reservoir, and a simulator valve is installed at an oil flow path which connects the simulation device and the oil reservoir.

Meanwhile, when hydraulic pressure is not generated by the hydraulic pressure supply device and hydraulic pressure, which is discharged from a master cylinder according to a pedal effort of the driver, is directly delivered to a wheel cylinder, the simulator valve is closed such that the hydraulic pressure delivered from the master cylinder is prevented from leaking.

However, when a leak occurs in the simulator valve, a dangerous situation may be caused by a braking force intended by the driver not being generated, and also production of high-quality products can be interrupted due to degradation of a feeling in terms of a pedal effort of braking.

PRIOR ART DOCUMENT (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system capable of inspecting a leak of hydraulic pressure delivered from a master cylinder in a backup mode.

Additional aspects of the disclosure will be set forth in part in the description which follows and, in part, will be obvious from the description, or may be learned by practice of the disclosure.

In accordance with one aspect of the present invention, there is provided an electric brake system, which comprises a master cylinder configured to discharge oil according to a pedal effort of a brake pedal; a simulation device provided with a simulator valve provided at a flow path connecting a simulation chamber, which is connected to the master cylinder to accommodate oil therein, to a first reservoir for storing oil therein so as to provide a reaction force according to the pedal effort of the brake pedal; and an inspection valve provided at a flow path connecting the first reservoir to the master cylinder or at a flow path connecting the master cylinder to the simulation device, wherein the simulator valve is provided to open the flow path connecting the simulation chamber to the first reservoir in a normal mode, and to block the flow path connecting the simulation chamber to the first reservoir in an abnormal mode, and wherein the inspection valve is provided to open the flow path connecting the first reservoir to the master cylinder or the flow path connecting the master cylinder to the simulation chamber in a braking mode, and to block the flow path connecting the first reservoir to the master cylinder or the flow path connecting the master cylinder to the simulation chamber in an inspection mode.

Also, the electric brake system further comprises a second reservoir connected to the master cylinder and configured to store oil therein; a pedal displacement sensor configured to sense a displacement of the brake pedal; a hydraulic pressure supply device configured to generate hydraulic pressure using a rotational force of a motor that is activated in response to an electrical signal output from the pedal displacement sensor; a hydraulic control unit configured to deliver the hydraulic pressure delivered from the hydraulic pressure supply device to a wheel cylinder provided at each of wheels; and an electronic control unit configured to control the motor and valves on the basis of hydraulic pressure information and displacement information of the brake pedal.

Also, the electric brake system further comprises a backup flow path configured to connect the master cylinder to the hydraulic control unit and connected to a hydraulic flow path connected to the hydraulic pressure supply device; and a cut valve provided at the backup flow path to control a hydraulic pressure flow, wherein the cut valve is closed to deliver the hydraulic pressure delivered from the hydraulic pressure supply device to the wheel cylinder in the normal mode, and the cut valve is opened to deliver the hydraulic pressure delivered from the master cylinder to the wheel cylinder in the abnormal mode.

Also, the electric brake system further comprises a pressure sensor provided at a lower side of the inspection valve of the backup flow path.

Also, the pressure sensor is provided between the inspection valve and a flow path branching to the simulation device.

Also, in the inspection mode, the electronic control unit blocks the simulator valve and the inspection valve, generates hydraulic pressure at the hydraulic pressure supply device, and then measures pressure through the pressure sensor to determine whether the simulator valve leaks.

Also, the electric brake system further comprises a pressure sensor provided at the backup flow path between the master cylinder and the simulation device.

Also, the pressure sensor is provided between the master cylinder of the backup flow path and a flow path branching to the simulation device.

Also, the inspection valve is a normally opened type solenoid valve that is usually open and is closed when a closing signal is received.

Also, the hydraulic pressure supply device includes: a hydraulic supply pressure chamber connected to the first reservoir through a hydraulic pressure supply oil flow path to store oil; and a check valve installed at the hydraulic pressure supply oil flow path and configured to allow oil to flow from the first reservoir to the hydraulic supply pressure chamber and to block the oil from flowing from the hydraulic supply pressure chamber to the first reservoir.

Also, the hydraulic pressure supply oil flow path branches between the first reservoir and the master cylinder; and the inspection valve is provided between the first reservoir and a branching point of the hydraulic pressure supply oil flow path.

In accordance with other aspect of the present invention, there is provided an electric brake system, which comprises a reservoir configured to store oil; a master cylinder, in which a first hydraulic port and a second hydraulic port are formed, connected to the reservoir, provided with one or more pistons, and configured to discharge oil according to a pedal effort of a brake pedal; a pedal displacement sensor configured to sense a displacement of the brake pedal; a first backup flow path configured to connect the first hydraulic port to a wheel cylinder; a second backup flow path configured to connect the second hydraulic port to a wheel cylinder; a first cut valve provided at the first backup flow path to control an oil flow therein; a second cut valve provided at the second backup flow path to control an oil flow therein; a simulation device provided at a flow path branching from the first backup flow path, provided with a simulator valve provided at a flow path connecting a simulation chamber, which accommodates oil, to a first reservoir, which stores oil, and configured to provide a reaction force according to the pedal effort of the brake pedal; an inspection valve provided at the first backup flow path, wherein the inspection valve is provided at a middle of a flow path that branches to the first hydraulic port and the simulation device; a hydraulic pressure supply device configured to generate hydraulic pressure using a rotational force of a motor that is activated in response to an electrical signal output from the pedal displacement sensor; a pressure sensor provided between the inspection valve and a flow path branching to the simulation device; a first hydraulic flow path connected to the hydraulic pressure supply device and connected to the first backup flow path; a second hydraulic flow path connected to the hydraulic pressure supply device and connected to the second backup flow path; a hydraulic control unit connected to the first and second hydraulic flow paths, configured to deliver the hydraulic pressure delivered from the hydraulic pressure supply device to a wheel cylinder provided at each of wheels, and including first and second hydraulic circuits respectively connected to different wheel cylinders; and an electronic control unit configured to control the motor and valves on the basis of hydraulic pressure information and displacement information of the brake pedal, wherein the simulator valve is provided to open a flow path connecting the simulation chamber to the reservoir in a normal mode, and to block the flow path connecting the simulation chamber to the reservoir in an abnormal mode, and wherein the inspection valve is provided to open a flow path connecting the master cylinder to the simulation chamber in a braking mode, and to block the flow path connecting the master cylinder to the simulation chamber in an inspection mode.

Also, the hydraulic control unit includes: a first inlet valve, a second inlet valve, a third inlet valve, and a fourth inlet valve which are provided at upstream sides of the wheel cylinders, respectively, to control the hydraulic pressure being delivered to the wheel cylinders provided at the wheels; a first switching valve configured to control a connection between the hydraulic pressure supply device and the first and second inlet valves and provided at a flow path at which the hydraulic pressure supply device is connected to the first backup flow path; and a second switching valve configured to control a connection between the hydraulic pressure supply device and the third and fourth inlet valves and provided at a flow path at which the hydraulic pressure supply device is connected to the second backup flow path.

Also, the hydraulic control unit includes: a first inlet valve, a second inlet valve, a third inlet valve, and a fourth inlet valve which are provided at upstream sides of the wheel cylinders, respectively, to control the hydraulic pressure being delivered to the wheel cylinders installed at the wheels; a first balance valve configured to control a connection between two wheel cylinders connected to the first inlet valve and the second inlet valve, respectively; and a second balance valve configured to control a connection between two wheel cylinders connected to the third inlet valve and the fourth inlet valve, respectively.

In accordance with another aspect of the present invention, there is provided an electric brake system, which comprises a reservoir configured to store oil; a master cylinder, in which a first hydraulic port and a second hydraulic port are formed, connected to the reservoir, provided with one or more pistons, and configured to discharge oil according to a pedal effort of a brake pedal; a pedal displacement sensor configured to sense a displacement of the brake pedal; a first backup flow path configured to connect the first hydraulic port to a wheel cylinder; a second backup flow path configured to connect the second hydraulic port to a wheel cylinder; a first cut valve provided at the first backup flow path to control an oil flow therein; a second cut valve provided at the second backup flow path to control an oil flow therein; a simulation device provided at a flow path branching from the first backup flow path, provided with a simulator valve provided at a flow path connecting a simulation chamber, which accommodates oil, to a first reservoir, which stores oil, and configured to provide a reaction force according to the pedal effort of the brake pedal; a hydraulic pressure supply device configured to generate hydraulic pressure using a rotational force of a motor that is activated in response to an electrical signal output from the pedal displacement sensor; an inspection valve provided at a flow path connecting the reservoir to the master cylinder; a pressure sensor provided between the inspection valve and a flow path branching to the simulation device; a first hydraulic flow path connected to the hydraulic pressure supply device and connected to the first backup flow path; a second hydraulic flow path connected to the hydraulic pressure supply device and connected to the second backup flow path; a hydraulic control unit connected to the first and second hydraulic flow paths, configured to deliver the hydraulic pressure delivered from the hydraulic pressure supply device to a wheel cylinder provided at each of wheels, and including first and second hydraulic circuits connected to different wheel cylinders, respectively; and an electronic control unit configured to control the motor and valves on the basis of hydraulic pressure information and displacement information of the brake pedal, wherein the simulator valve is provided to open a flow path connecting the simulation chamber to the reservoir in a normal mode, and to block the flow path connecting the simulation chamber to the reservoir in an abnormal mode, and wherein the inspection valve is provided to open a flow path connecting the reservoir to the master cylinder in a braking mode, and to block the flow path connecting the reservoir to the master cylinder in an inspection mode.

Also, the electronic control unit opens the first cut valve and the inspection valve to allow the hydraulic pressure provided from the hydraulic pressure supply device to be delivered to the reservoir in a first drag reduction mode, and blocks the inspection valve to allow the hydraulic pressure of the wheel cylinder to be delivered to the hydraulic pressure supply device by means of negative pressure provided therefrom.

BRIEF DESCRIPTION OF THE DRAWINGS

FIG. 1 is a hydraulic circuit diagram illustrating a non-braking state of an electric brake system according to a first embodiment of the present disclosure.

FIG. 2 is a hydraulic circuit diagram illustrating a state in which the electric brake system according to the first embodiment of the present disclosure normally performs a braking operation.

FIG. 3 is a hydraulic circuit diagram illustrating a state in which the electric brake system according to the first embodiment of the present disclosure releases braking normally.

FIG. 4 is a hydraulic circuit diagram for describing a state in which an anti-lock brake system (ABS) is operated through the electric brake system according to the first embodiment of the present disclosure.

FIG. 5 is a hydraulic circuit diagram illustrating a case in which the electric brake system according to the first embodiment of the present disclosure operates abnormally.

FIG. 6 is a hydraulic circuit diagram illustrating a state in which a leak occurs in the simulator valve of the electric brake system according to the first embodiment of the present disclosure.

FIG. 7 is a hydraulic circuit diagram illustrating a state in which it is inspected whether a leak occurs in a simulator valve in the electric brake system according to the first embodiment of the present disclosure.

FIG. 8 is a hydraulic circuit diagram illustrating a non-braking state of an electric brake system according to the second embodiment of the present disclosure.

FIG. 9 is a hydraulic circuit diagram illustrating a normal braking state of the electric brake system according to the second embodiment of the present disclosure.

FIG. 10 is a hydraulic circuit diagram illustrating a state in which the electric brake system according to the second embodiment of the present disclosure normally releases braking.

FIG. 11 is a hydraulic circuit diagram for describing a state in which an ABS is operated through the electric brake system according to the second embodiment of the present disclosure.

FIG. 12 is a hydraulic circuit diagram for describing a state in which the electric brake system of the second embodiment of the present disclosure operates in a dump mode.

FIG. 13 is a hydraulic circuit diagram illustrating a state in which the electric brake system according to the second embodiment of the present disclosure operates abnormally.

FIG. 14 is a hydraulic circuit diagram illustrating a state in which the electric brake system according to the second embodiment of the present disclosure inspects whether a leak of a simulator valve occurs.

FIG. 15 is a hydraulic circuit diagram illustrating a non-braking state of an electric brake system according to a third embodiment of the present disclosure.

FIG. 16 is a hydraulic circuit diagram illustrating a state in which it is inspected whether a leak occurs in a simulator valve in the electric brake system according to the third embodiment of the present disclosure.

FIGS. 17 and 18 are hydraulic circuit diagrams illustrating a state in which a drag reduction mode is executed in the electric brake system according to the third embodiment of the present disclosure.

FIG. 19 is a hydraulic circuit diagram illustrating a non-braking state of the electric brake system according to the fourth embodiment of the present disclosure.

FIG. 20 is a hydraulic circuit diagram illustrating a state in which it is inspected whether a leak occurs or not in a simulator valve in the electric brake system according to the fourth embodiment of the present disclosure.

FIGS. 21 and 22 are hydraulic circuit diagrams illustrating a state in which a drag reduction mode is executed in the electric brake system according to the fourth embodiment of the present disclosure.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to a first embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a are provided at the two chambers, respectively, and the first piston 21a and the input rod 12 are connected to each other.

Meanwhile, the master cylinder 20 may include two chambers to secure safety when one chamber fails. For example, one of two chambers may be connected to a front right wheel FR and a rear left wheel RL and the remaining chamber may be connected to a front left wheel FL and a rear right wheel RR. Otherwise, one of two chambers may be connected to two front wheels FR and FL and the remaining chamber may be connected to two rear wheels RR and RL. As described above, the two chambers may be independently configured so that braking of a vehicle may be possible even when one of the two chambers fails.

For this purpose, the master cylinder 20 may include first and second hydraulic ports 24a and 24b which are formed thereon and through which hydraulic pressure is discharged from each of the two chambers.

Also, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided at the two chambers, respectively, to store an elastic force when the first piston 21a and the second piston 22a are compressed according to a variance of displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to the pedal effort of the brake pedal 10. A reaction force may be provided to compensate for a pedal effort provided from a driver such that a braking force may be finely controlled as intended by the driver.

Referring to FIG. 1, the simulation device 50 includes a simulation chamber 51 provided to store oil discharged from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. The reservoirs may be configured with the same components and may alternatively be configured with different components. As one example, the reservoir 30 connected to the simulation device 50 may be the same as the reservoir 30 connected to the master cylinder 20 or may be a storage part capable of storing oil separately from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver brake oil between the simulation chamber 51 and the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided with two wheels, controlling a hydraulic pressure flow delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 54, 221, 222, 223, 224, 231, 232, 241, 242, 261, and 262 based on hydraulic pressure information and pedal displacement information.

The hydraulic pressure supply device 100 includes a hydraulic pressure supply unit 110 providing hydraulic pressure delivered to the wheel cylinder 40, a motor 120 generating a rotational force in response to an electrical signal of the pedal displacement sensor 11, and a power conversion unit 130 converting a rotational movement of the motor 120 into a rectilinear movement and transmitting the rectilinear movement to the hydraulic pressure supply unit 110.

The hydraulic pressure supply unit 110 may include a pressure chamber 111 in which a predetermined space is formed to receive and store oil therein, a hydraulic piston 112 provided inside the pressure chamber 111, and a hydraulic spring 113 provided between the hydraulic piston 112 and the pressure chamber 111 to elastically support the hydraulic piston 112.

The pressure chamber 111 may be connected to the reservoir 30 by means of an oil flow path 114 and may receive oil from the reservoir 30 and store the oil therein. The oil flow path 114 may communicate with a first communicating hole 111a that is formed at an inlet side of the pressure chamber 111. As one example, the first communicating hole 111a may be formed at the inlet side of the pressure chamber 111 in which pressure is generated while the hydraulic piston 112 is moved forward.

Also, a check valve 115 may be installed at the oil flow path 114 to prevent the pressure of the pressure chamber 111 from backflowing. The check valve 115 is provided to block the oil inside the pressure chamber 111 from leaking to the reservoir 30 through the oil flow path 114 while the hydraulic piston 112 is moved forward, and it is provided to allow the oil inside the reservoir 30 to be suctioned and stored in the inlet side of the pressure chamber 111 while the hydraulic piston 112 is returned to its original position.

Also, in an operation of suctioning the hydraulic pressure inside the pressure chamber 111 while the hydraulic piston 112 is returned to its original position, the hydraulic pressure supply device 100 may be configured to prevent a case in which pressure inside the pressure chamber 111 is not released to atmospheric pressure. As one example, a second communicating hole 111b is formed at the pressure chamber 111, and a connecting flow path 116 connecting the second communicating hole 111b to the oil flow path 114 is formed between an outlet side of the pressure chamber 111 and the oil flow path 114. At this point, the second communicating hole 111b may be formed at a position corresponding to an initial position of the hydraulic piston 112 (that is, a position of the hydraulic piston 112 when the hydraulic piston 112 is moved backward toward the outlet side of the pressure chamber 111 so that the pressure thereinside is released therefrom). Consequently, while the hydraulic piston 112 is returned to its original position, the outlet side of the pressure chamber 111 may be automatically connected to the reservoir 30 through the connecting flow path 116 so that the pressure may be returned to atmospheric pressure.

The motor 120 is a device for generating a rotational force according to a signal output from the ECU (not shown) and may generate a rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120 but also valves provided in the electric brake system 1 of the present disclosure, which will be described below. An operation of controlling a plurality of valves according to a displacement of the brake pedal 10 will be described below.

A driving force of the motor 120 generates a displacement of the hydraulic piston 112 through the power conversion unit 130, and the hydraulic pressure is delivered to the wheel cylinder 40 installed at each of the wheels RR, RL, FR, and FL through first and second hydraulic flow paths 211 and 212, wherein the hydraulic pressure is generated while the hydraulic piston 112 slides inside the pressure chamber 111.

The power conversion unit 130 is a device for converting a rotational force into a rectilinear movement and may be configured with a worm shaft 131, a worm wheel 132, and a drive shaft 133.

The worm shaft 131 may be integrally formed with a rotational shaft of the motor 120 and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the hydraulic piston 112 to slide the hydraulic piston 112 inside the pressure chamber 111.

To describe such operations again, a signal, which is sensed by the pedal displacement sensor 11 when a displacement occurs at the brake pedal 10, is transmitted to the ECU (not shown) and then the ECU activates the motor 120 in one direction to rotate the worm shaft 131 in the one direction. A rotational force of the worm shaft 131 is transmitted to the drive shaft 133 via the worm wheel 132, and then the hydraulic piston 112 connected to the drive shaft 133 is moved to generate hydraulic pressure in the pressure chamber 111.

On the other hand, when the pedal effort is released from the brake pedal 10, the ECU drives the motor 120 in a reverse direction to reversely rotate the worm shaft 131. Consequently, the worm wheel 132 is also reversely rotated, and then the hydraulic piston 112 connected to the drive shaft 133 is returned to its original position. At this point, the hydraulic spring 113 may provide an elastic force to the hydraulic piston 112 so that the hydraulic pressure inside the pressure chamber 111 may be rapidly delivered.

As described above, the hydraulic pressure supply device 100 serves to deliver the hydraulic pressure to the wheel cylinders 40 or to suction and deliver the hydraulic pressure to the reservoir 30 according to a rotational direction of the rotational force generated from the motor 120.

Further, although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft, and a ball nut which is screw-coupled to the screw in a state in which a rotation of the ball nut is restricted to perform a rectilinear movement according to a rotation of the screw. The hydraulic piston 112 is connected to the ball nut of the power conversion unit 130 to pressurize the pressure chamber 111 by means of the rectilinear movement of the ball nut, and the hydraulic spring 113 serves to return the hydraulic piston 112 to its original position while the ball nut is returned to its original position. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Next, the hydraulic control unit 200 according to the first embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 installed at each of the wheels FR, FL, RR, and RL performs braking by receiving the hydraulic pressure.

Also, the hydraulic control unit 200 may receive hydraulic pressure from the hydraulic pressure supply device 100 through the first hydraulic flow path 211 connecting the first hydraulic circuit 201 and the hydraulic pressure supply device 100, and the second hydraulic flow path 212 connected to the second hydraulic circuit 202. At this point, the second hydraulic flow path 212 may be connected to a branching flow path 214 that branches from the first hydraulic flow path 211.

Further, the first and second hydraulic flow paths 211 and 212 are connected to each other through the branching flow path 214 and receive the hydraulic pressure from the hydraulic pressure supply device 100 to deliver the received hydraulic pressure to the wheel cylinder 40 of each of the hydraulic circuits 201 and 202. At this point, each of the hydraulic circuits 201 and 202 may be provided with a plurality of inlet valves 221 to control a hydraulic pressure flow.

As one example, two inlet valves 221 may be provided in the first hydraulic circuit 201 connected to the first hydraulic flow path 211, thereby independently controlling the hydraulic pressure delivered to two wheel cylinders 40. Also, two inlet valves 221 are provided in the second hydraulic circuit 202 connected to the second hydraulic flow path 212, thereby independently controlling the hydraulic pressure delivered to two wheel cylinders 40.

The plurality of inlet valves 221 may be disposed at an upstream side of each of the wheel cylinders 40 and may be configured with a normally opened type solenoid valve that is usually opened and is closed when a closing signal is received from the ECU.

Also, the hydraulic control unit 200 may be further provided with a plurality of outlet valves 222 connected to the reservoirs 30 to improve brake release performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU.

In addition, the electric brake system 1 according to the first embodiment of the present disclosure may further include a first switching valve 231 provided at the first hydraulic flow path 211 and a second switching valve 232 provided at the second hydraulic flow path 212.

The first and second switching valves 231 and 232 are independently controlled and may be configured with a normally closed type solenoid valve that is usually closed and is opened when an opening signal is received. The first and second switching valves 231 and 232 serve to control a hydraulic pressure flow being delivered to the wheel cylinders 40 by being selectively opened and closed according to a required pressure. For example, when hydraulic pressure should be delivered only to the wheel cylinders 40 provided at the first hydraulic circuit 201, the first switching valve 231 is opened to deliver the hydraulic pressure discharged through the hydraulic pressure supply device 100 only to the first hydraulic circuit 201 instead of the second hydraulic circuit 202. Operational structures of the first and second switching valves 231 and 232 will be described again below.

Also, the electric brake system 1 according to the first embodiment of the present invention may further include a release valve 233 that controls a pressure to converge on a set target pressure value when the pressure according to a pedal effort of the brake pedal 10 is generated to be higher than the set target pressure value.

The release valve 233 may be provided at a flow path connecting the reservoir 30 to the branching flow path 214 that connects the two hydraulic circuits 201 and 202. That is, the release valve 233 may be provided between the first and second switching valves 231 and 232 and the hydraulic pressure supply device 100. The release valve 233 may be configured with a normally closed type solenoid valve that is usually closed and is opened when an opening signal is received.

The electric brake system 1 according to the first embodiment of the present disclosure may further include first and second backup flow paths 251 and 252 capable of directly supplying the oil discharged from the master cylinder 20 to the wheel cylinders 40 when the electric brake system 1 abnormally operates.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24a to the first hydraulic circuit 201, and the second backup flow path 252 may connect the second hydraulic port 24b to the second hydraulic circuit 202.

Further, the first and second cut valves 261 and 262 may be configured with a normally open type solenoid valve that is usually open and is closed when a closing signal is received from the ECU. Operational structures of the first and second cut valves 261 and 262 will be described again below.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Hereinafter, an operation of the electric brake system 1 according to the first embodiment of the present invention will be described in detail.

FIG. 2 is a hydraulic circuit diagram illustrating a state in which the electric brake system 1 according to the first embodiment of the present disclosure normally performs a braking operation.

Referring to FIG. 2, when a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at the outlet side of the master cylinder 20 and the first and second hydraulic flow path pressure sensors PS11 and PS12 respectively provided at the first and second hydraulic circuits 201 and 202, and may calculate an amount of braking friction based on a difference between the amount of braking requested by the driver and the amount of regenerative braking, thereby determining the magnitude of an increase or reduction of pressure at the wheel cylinder 40.

In particular, when the driver steps on the brake pedal 10 at an initial stage of braking, the motor 120 is activated, a rotational force of the motor 120 is delivered to the hydraulic pressure supply unit 110 by means of the power conversion unit 130, and thus the hydraulic pressure delivered from the hydraulic pressure supply unit 110 is delivered to the first hydraulic flow path 211 and the second hydraulic flow path 212.

Meanwhile, when the hydraulic pressure is generated in the hydraulic pressure supply device 100, the first and second cut valves 261 and 262, which are installed at the first and second backup flow paths 251 and 252 connected to the first and second hydraulic ports 24a and 24b of the master cylinder 20, are closed so that the hydraulic pressure delivered from the master cylinder 20 is not delivered to the wheel cylinders 40.

Also, the hydraulic pressure delivered from the hydraulic pressure supply device 100 is delivered to the wheel cylinder 40 installed at each of the wheels RR, RL, FR, and FL according to the opening of the inlet valves 221 to generate a braking force. At this point, when the pressure delivered to the first and second hydraulic circuits 201 and 202 is measured as being higher than a target pressure value according to the pedal effort of the brake pedal 10, the release valve 233 is opened to control the pressure to converge on the target pressure value.

Meanwhile, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at the rear end of the simulation chamber 51 is opened so that the oil filled in the simulation chamber 51 is delivered to the reservoir 30 through the simulator valve 54. Also, the reaction force piston 52 is moved, and pressure corresponding to a weight of the reaction force spring 53 supporting the reaction force piston 52 is generated inside the simulation chamber 51 to provide an appropriate pedal feeling to the driver.

Next, a case of releasing the braking force in a braking state established when the electric brake system 1 according to the first embodiment of the present disclosure operates normally will be described.

FIG. 3 is a hydraulic circuit diagram illustrating a state in which the electric brake system 1 according to the first embodiment of the present disclosure releases braking normally.

Referring to FIG. 3, when a pedal effort applied to the brake pedal 10 is released, the motor 120 generates a rotational force in a reverse direction compared to that of when the braking operation is performed to deliver the generated rotational force to the power conversion unit 130, and the worm shaft 131, the worm wheel 132, and the drive shaft 133 of the power conversion unit 130 are rotated in a reverse direction compared to that of when the braking operation is performed to move the hydraulic piston 112 backward and return the hydraulic piston 112 to its original position, thereby releasing the pressure of the hydraulic pressure supply unit 110. Further, the hydraulic pressure supply unit 110 receives the hydraulic pressure delivered from the wheel cylinder 40 through the first and second hydraulic flow paths 211 and 212 to deliver the received hydraulic pressure to the reservoir 30.

Meanwhile, opening and closing operational states of the inlet valves 221, the outlet valves 222, the first and second switching valves 231 and 232, the release valve 233, and the first and second cut valves 261 and 262 are controlled the same way as they are in the braking operation. That is, the outlet valves 222, the release valve 240, and the first and second cut valves 261 and 262 are closed, whereas the inlet valves 221 and the first and second switching valves 231 and 232 are opened. As a result, the hydraulic pressure delivered from the wheel cylinders 40 of the first and second hydraulic circuits 201 and 202 is delivered to the pressure chamber 111 through the first and second hydraulic flow paths 211 and 212.

Meanwhile, in the simulation device 50, the oil in the simulation chamber 51 is delivered to the master cylinder 20 according to the return of the reaction force piston 52 to its original position by means of the elastic force of the reaction force spring 53, and the oil is refilled in the simulation chamber 51 through the simulator valve 54 and the simulator check valve 55 which are connected to the reservoir 30 to ensure a rapid return of pressure of the pedal simulator.

Also, when the hydraulic piston 112 is moved through the hydraulic pressure supply device 100, an oil flow inside the pressure chamber 111 may be controlled through the oil flow path 114 and the connecting flow path 116 which are connected to the reservoir 30.

Further, the electric brake system 1 according to the first embodiment of the present disclosure may control the valves 221 and 222 provided at the hydraulic control unit 200 according to pressure required for the wheel cylinder 40 provided at each of the wheels RR, RL, FR, and FL of the two hydraulic circuits 201 and 202, thereby specifying and controlling a control range.

FIG. 4 is a hydraulic circuit diagram for describing a state in which an anti-lock brake system (ABS) is operated through the electric brake system 1 according to the first embodiment of the present disclosure.

FIG. 4 show a case of braking only a relevant wheel cylinder during operation of the ABS, and a state of braking only the wheels RL and FR of the first hydraulic circuit 201 is illustrated.

Referring to FIG. 4, the motor 120 is activated according to a pedal effort of the brake pedal 10, and a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure delivered from the master cylinder 20 is not delivered to the wheel cylinders 40.

Also, because only the first switching valve 231 is opened and the second switching valve 232 is closed, the hydraulic pressure delivered from the hydraulic pressure supply device 100 is not delivered to the second hydraulic circuit 202. Further, the hydraulic pressure delivered from the hydraulic pressure supply device 100 is delivered to only the wheel cylinders 40 of the front right wheel FR and the rear left wheel RL, which are provided at the first hydraulic circuit 201, through the first hydraulic flow path 211. Consequently, the hydraulic pressure is delivered to only the wheels RL and FR of the first hydraulic circuit 201.

Meanwhile, the structure for controlling the hydraulic pressure delivered to the wheel cylinders 40 through opening and closing operations of the first and second switching valves 231 and 232 is merely the first embodiment, and it should be understood that the embodiment of the present disclosure may include a variety of control modules capable of increasing or reducing the hydraulic pressure delivered to each of the wheels RL, RR, FL, and FR by independently opening and closing the inlet valves 221, the outlet valves 222, and the first and second switching valves 231 and 232.

That is, the electric brake system 1 according to the embodiment of the present disclosure may independently control operations of the motor 120 and the respective valves 54, 221, 222, 231, 232, 233, 261, and 262 to selectively deliver or discharge the hydraulic pressure to or from the wheel cylinder 40 of each of the wheels RL, RR, FL, and FR according to a required pressure such that a precise control of the hydraulic pressure may be possible.

Next, a case in which such an electric brake system 1 operates abnormally will be described.

FIG. 5 is a hydraulic circuit diagram illustrating a case in which the electric brake system 1 according to the first embodiment of the present disclosure operates abnormally.

Referring to FIG. 5, when the electric brake system 1 operates abnormally, each of the valves 54, 221, 222, 231, 232, 233, 261, and 262 is provided in an initial state of braking, that is, a non-operating state. When a driver pressurizes the brake pedal 10, the input rod 12 connected to the brake pedal 10 is moved forward (in a left direction of FIG. 5), and the first piston 21a, which is in contact with the input rod 12, is moved forward (in the left direction of FIG. 5) at the same time that the second piston 22a is moved forward by means of the first piston 21a. At this point, because there is no gap between the input rod 12 and the first piston 21a, the braking may be rapidly performed.

Further, the hydraulic pressure delivered from the master cylinder 20 is delivered to the wheel cylinders 40 through the first and second backup flow paths 251 and 252 that are connected for the purpose of backup braking to realize a braking force. At this point, the first and second cut valves 261 and 262 respectively installed at the first and second backup flow paths 251 and 252 and the inlet valve 221 provided at the upstream side of each of the wheels RR, RL, FR, and FL are configured with a normally opened type solenoid valve, and the simulator valve 54, the outlet valves 222, the first and second switching valves 231 and 232, and the release valve 233 are configured with a normally closed type solenoid valve so that the hydraulic pressure is directly delivered to the wheel cylinders 40. Therefore, braking is stably realized to improve braking safety.

Next, a case in which a leak occurs in the simulator valve 54 of the electric brake system 1 according to the first embodiment of the present disclosure and a method capable of inspecting for the occurrence of a leak will be described with reference to FIGS. 6 and 7.

FIG. 6 is a hydraulic circuit diagram illustrating a state in which a leak occurs in the simulator valve 54 of the electric brake system 1 according to the first embodiment of the present disclosure.

When the electric brake system 1 operates abnormally, each of the valves 54, 221, 222, 231, 232, 233, 261, and 262 are provided in the initial state of braking, that is, the non-operating state as shown in FIG. 5, and the first and second cut valves 261 and 262 installed at the first and second backup flow paths 251 and 252 and the inlet valve 221 provided at the upstream side of each of the wheels RR, RL, FR, and FL are opened, and thus the hydraulic pressure is directly delivered to the wheel cylinders 40.

Also, the first and second switching valves 231 and 232 are provided in a closed state to block the first and second hydraulic flow paths 211 and 212, and the simulator valve 54 is provided in a closed state to prevent the hydraulic pressure delivered to the wheel cylinders 40 through the first backup flow path 251 from leaking into the reservoir 30 through the simulation device 50.

Therefore, as a driver steps on the brake pedal 10, the hydraulic pressure delivered from the master cylinder 20 is delivered to the wheel cylinders 40 without loss to ensure stable braking.

As shown in FIG. 6, however, when a leak occurs in the simulator valve 54, a portion of the hydraulic pressure delivered from the master cylinder 20 may be lost to the reservoir 30 through the simulator valve 54. The simulator valve 54 is provided to be closed in an abnormal mode, and the hydraulic pressure delivered from the master cylinder 20 pushes the reaction force piston 52 of the simulation device 50 so that a leak may occur in the simulator valve 54 by means of pressure formed at the rear end of the simulation chamber 51.

As a result, when a leak occurs in the simulator valve 54, it may be difficult to obtain a braking force intended by the driver. Consequently, a problem of braking safety may occur.

FIG. 7 is a hydraulic circuit diagram illustrating a state in which it is inspected whether a leak occurs in a simulator valve in the electric brake system 1 according to the first embodiment of the present disclosure.

The electric brake system 1 according to the first embodiment of the present disclosure may further include an inspection valve 60 that is installed at one or more of the first and second backup flow paths 251 and 252 connected to the master cylinder 20. As one example, the inspection valve 60 may be installed between the first hydraulic port 24a of the master cylinder 20 and the simulation device 50 to control the hydraulic pressure delivered between the master cylinder 20 and the simulation device 50.

The inspection valve 60 may be configured with a normally opened type solenoid valve that is usually open and is closed when a closing signal is received. As one example, in a braking mode in which a driver applies a pedal effort to the brake pedal 10, the inspection valve 60 is maintained in an open state, and the hydraulic pressure delivered from the master cylinder 20 is delivered to the simulation device 50 so that the pedal effort is provided to the driver. In addition, the inspection valve 60 may be maintained in a closed state in an inspection mode to prevent the hydraulic pressure delivered from the hydraulic pressure supply device 100 from being delivered to the master cylinder 20.

The inspection mode is a mode that inspects whether a loss of pressure exists by generating hydraulic pressure at the hydraulic pressure supply device 100 to inspect whether a leak occurs in the simulator valve 54. When the hydraulic pressure delivered from the hydraulic pressure supply device 100 is delivered to the master cylinder 20, it is difficult to identify whether a leak occurs in the simulator valve 54 due to pressure being lost to the master cylinder 20 and the reservoir 30 being large.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, the outlet valves 222, and the release valve 233 are closed and thus the flow paths connecting the hydraulic pressure supply device 100 to the reservoirs 30 are closed so that the closed circuit may be configured.

In the electric brake system 1 according to the first embodiment of the present disclosure, the inspection valve 60 is installed at only the first backup flow path 251, which is connected to the simulation device 50, of the first and second backup flow paths 251 and 252. Therefore, it is necessary to prevent the hydraulic pressure delivered from the hydraulic pressure supply device 100 from being delivered to the master cylinder 20 through the second backup flow path 252. For this purpose, the second cut valve 262 or the second switching valve 232 may be maintained in the closed state in the inspection mode.

In the inspection mode, whether a loss of the hydraulic pressure occurs may be determined through a measurement by means of the backup flow path pressure sensor PS2 after the hydraulic pressure is generated in the hydraulic pressure supply device 100. When the measurement result of the backup flow path pressure sensor PS2 indicates no occurrence of loss, a leak of the simulator valve 54 may be determined as not existing, and otherwise, when the measurement result thereof indicates the occurrence of loss, a leak may be determined as existing in the simulator valve 54.

Meanwhile, the inspection mode may be controlled to be executed when a vehicle is stopped or when it is determined that the driver has no intent to accelerate the vehicle. In the inspection mode, the hydraulic pressure delivered from the hydraulic pressure supply device 100 is provided to the wheel cylinders 40 to generate a certain amount of braking force. As a result, there is a problem in that acceleration intended by the driver is not realized due to the braking force which has been provided even when the driver steps on an accelerator pedal (not shown).

As one example, the inspection mode may be controlled to be executed when a predetermined time passes after the vehicle has been stopped, in a state in which a hand brake is currently operated, or when the driver applies a predetermined braking force to the vehicle.

Also, when it is determined that the drive has an intent to accelerate the vehicle in a state of the inspection mode, the hydraulic pressure of the wheel cylinders 40 may be rapidly eliminated. That is, when the driver activates the accelerator pedal in the state of the inspection mode, the hydraulic pressure supply device 100 may be operated in reverse to an operation performed in the state of the inspection mode so that the hydraulic pressure of the wheel cylinders 40 may be rapidly eliminated. At this point, the outlet valves 222 may also be opened to assist in releasing the hydraulic pressure of the wheel cylinders 40 to the reservoirs 30.

Next, a hydraulic control unit 200-1 according to a second embodiment of the present disclosure will be described with reference to FIG. 8.

FIG. 8 is a hydraulic circuit diagram illustrating a non-braking state of an electric brake system 2 according to the second embodiment of the present disclosure.

The hydraulic control unit 200-1 may be configured with a first hydraulic circuit 201-1 and a second hydraulic circuit 202-1, each of which receives hydraulic pressure to control two wheels. As one example, the first hydraulic circuit 201-1 may control a front right wheel FR and a rear left wheel RL, and the second hydraulic circuit 202-1 may control a front left wheel FL and a rear right wheel RR. A wheel cylinder 40 is installed at each of the wheels FR, FL, RR, and RL and receives hydraulic pressure to perform a braking operation thereon.

Also, the hydraulic control unit 200-1 may receive the hydraulic pressure from the hydraulic pressure supply device 100 through a main hydraulic flow path 210 connected to the first and second hydraulic circuits 201-1 and 202-1. Further, each of the hydraulic circuits 201-1 and 202-1 may include a plurality of valves 221a, 221b, 221c, 221d, 222a, 222b, 222c, 222d, 241, and 242 to control a hydraulic pressure flow.

The first hydraulic circuit 201-1 may include first and second inlet valves 221a and 221b connected to the main hydraulic flow path 210 to control the hydraulic pressure delivered to the wheel cylinders 40, first and second outlet valves 222a and 222b which control oil discharged from the wheel cylinders 40 provided at the first hydraulic circuit 201-1, and a first balance valve 241 which opens and blocks between two wheel cylinders 40 respectively connected to the first inlet valve 221a and the second inlet valve 221b.

More particularly, the first inlet valve 221a is provided at a first hydraulic flow path 213 connected to the main hydraulic flow path 210 and the front right wheel FR, and the second inlet valve 221b is provided at a second hydraulic flow path 214 connected to the main hydraulic flow path 210 and the rear left wheel RL.

The first outlet valve 222a is connected to the first hydraulic flow path 213 to control the hydraulic pressure delivered from the wheel cylinder 40 of the front right wheel FR, and the second outlet valve 222b is connected to the second hydraulic flow path 214 to control the hydraulic pressure delivered from the wheel cylinder 40 of the rear left wheel RL.

The first balance valve 241 is provided at a flow path connecting the first hydraulic flow path 213 to the second hydraulic flow path 214 to serve to open or block between the first and second hydraulic flow paths 213 and 214 according to opening and closing operations.

The second hydraulic circuit 201-1 may include third and fourth inlet valves 221c and 221d connected to the main hydraulic flow path 210 to control hydraulic pressure delivered to the wheel cylinders 40, third and fourth outlet valves 222c and 222d which control oil discharged from the wheel cylinders 40 provided at the second hydraulic circuit 202-1, and a second balance valve 242 which opens and blocks between two wheel cylinders 40 respectively connected to the third inlet valve 221c and the fourth inlet valve 221d.

More particularly, the third inlet valve 221c is provided at a third hydraulic flow path 215 connected to the main hydraulic flow path 210 and the rear right wheel RR, and the fourth inlet valve 221*d* is provided at a fourth hydraulic flow path 216 connected to the main hydraulic flow path 210 and the front left wheel FL.

The third outlet valve 222*c* is connected to the third hydraulic flow path 215 to control the hydraulic pressure delivered from the wheel cylinder 40 of the rear right wheel RR, and the fourth outlet valve 222*d* is connected to the fourth hydraulic flow path 216 to control the hydraulic pressure delivered from the wheel cylinder 40 of the front left wheel FL.

The second balance valve 242 is provided at a flow path connecting the third hydraulic flow path 215 to the fourth hydraulic flow path 216 to open or block between the third and fourth hydraulic flow paths 215 and 216 according to opening and closing operations.

Meanwhile, the opening and closing operations of the first to fourth inlet valves 221*a*, 221*b*, 221*c*, and 221*d* may be independently controlled by an ECU to deliver the hydraulic pressure delivered from the hydraulic pressure supply device 100 to each of the wheel cylinders 40. As one example, the first and second inlet valves 221*a* and 221*b* may control the hydraulic pressure supplied to the first hydraulic circuit 201-1, and the third and fourth inlet valves 221*c* and 221*d* may control the hydraulic pressure supplied to the second hydraulic circuit 202-1.

Also, the opening and closing operations of the first to fourth outlet valves 222*a*, 222*b*, 222*c*, and 222*d* may be independently controlled by the ECU to deliver the hydraulic pressure of the wheel cylinders 40 to reservoirs 30. As one example, the first and second outlet valves 222*a* and 222*b* may control the hydraulic pressure delivered from the wheel cylinders 40 of the first hydraulic circuit 201-1, and the third and fourth outlet valves 222*c* and 222*d* may control the hydraulic pressure delivered from the wheel cylinders 40 of the second hydraulic circuit 202-1.

Further, the electric brake system 2 may open two inlet valves among the four inlet valves 221*a*, 221*b*, 221*c*, and 221*d* to deliver the hydraulic pressure to the wheel cylinder 40 of each of the wheels FR, FL, RR, and RL. As one example, the first inlet valve 221*a* of the first and second inlet valves 221*a* and 221*b* may be opened and the fourth inlet valve 221*d* of the third and fourth inlet valves 221*c* and 221*d* may be opened so that the hydraulic pressure may be delivered to the wheel cylinder 40 of each of the wheels FR, FL, RR, and RL.

Meanwhile, the hydraulic pressure passing through the first and fourth inlet valves 221*a* and 221*d* may be delivered to neighboring wheel cylinders 40 through the first and second balance valves 241 and 242. As one example, the two inlet valves 221*a* and 221*d* may be opened in the first hydraulic circuit 201-1 and the second hydraulic circuit 202-1, respectively, and thus the hydraulic pressure may be delivered to each of the wheel cylinders 40. Also, according to a structure of a flow path connection, the two inlet valves 221*a* and 221*b* provided at the first hydraulic circuit 201-1 or the two inlet valves 221*c* and 221*d* provided at the second hydraulic circuit 202-1 may be opened so that the hydraulic pressure may be delivered to each of the wheel cylinders 40. In addition, when emergency braking is required, all of the inlet valves 221*a*, 221*b*, 221*c*, and 221*d* may be opened to rapidly deliver the hydraulic pressure to the wheel cylinders 40.

Such first to fourth inlet valves 221*a*, 221*b*, 221*c*, and 221*d* may be configured with a normally closed type solenoid valve that is usually closed and is opened when an opening signal is received from the ECU.

Also, the first and second balance valves 241 and 242 may be configured with a normally opened type solenoid valve that is usually open and is closed when a closing signal is received from the ECU, and the first to fourth outlet valve 222*a*, 222*b*, 222*c*, and 222*d* may be configured with a normally closed type solenoid valve that is usually closed and is opened when an opening signal is received from the ECU.

The electric brake system 2 according to the second embodiment of the present disclosure may further include first and second backup flow paths 251 and 252 capable of directly supplying oil discharged from the master cylinder 20 to the wheel cylinders 40 when the electric brake system 2 operates abnormally.

A first cut valve 261 for controlling an oil flow may be provided at the first backup flow path 251, and a second cut valve 262 for controlling an oil flow may be provided at the second backup flow path 252. Also, the first backup flow path 251 may connect a first hydraulic port 24*a* to the first hydraulic circuit 201-1, and the second backup flow path 252 may connect a second hydraulic port 24*b* to the second hydraulic circuit 202-1.

In addition, the first backup flow path 251 may be connected to the first balance valve 241, which connects the first hydraulic flow path 213 to the second hydraulic flow path 214, and the second backup flow path 252 may be connected to the second balance valve 242, which connects the third hydraulic flow path 215 to the fourth hydraulic flow path 216.

Further, the first and second cut valves 261 and 262 may be configured with a normally opened type solenoid valve that is usually open and is closed when a closing signal is received from the ECU. Operational structures of the first and second cut valves 261 and 262 will be described again below.

Meanwhile, an undescribed reference number "PS1" is a hydraulic flow path pressure sensor which senses hydraulic pressure of the hydraulic control unit 200-1, and an undescribed reference number "PS2" is a backup flow path pressure sensor which measures oil pressure of the master cylinder 20. Further, an undescribed reference number "MPS" is a motor control sensor which controls a rotational angle or a current of a motor 120.

Hereinafter, an operation of the electric brake system 2 according to the second embodiment of the present disclosure will be described in detail.

FIG. 9 is a hydraulic circuit diagram illustrating a normal braking state of the electric brake system 2 according to the second embodiment of the present disclosure.

Referring to FIG. 9, when a driver begins braking, an amount of braking requested by the driver may be sensed through a pedal displacement sensor 11 based on information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at an outlet side of the master cylinder 20 and the hydraulic flow path pressure sensor PS1 provided at the main hydraulic flow path 210, and calculate an amount of braking friction based on a difference between the amount of braking requested by the driver and the amount of regenerative braking, thereby determining a magnitude of an increase or reduction of pressure at the wheel cylinder 40.

In particular, when the driver steps on the brake pedal 10 at an initial stage of braking, the motor 120 is activated, a rotational force of the motor 120 is delivered to the hydraulic pressure supply unit 110 by means of a power conversion unit 130, and thus the hydraulic pressure delivered from the hydraulic pressure supply unit 110 is delivered to the first to fourth hydraulic flow paths 213a, 214b, 215c, and 216d through the main hydraulic flow path 210.

Meanwhile, when the hydraulic pressure is delivered from the hydraulic pressure supply device 100, the first and second cut valves 261 and 262, which are installed at the first and second backup flow paths 251 and 252 connected to the first and second hydraulic ports 24a and 24b of the master cylinder 20, are closed so that the hydraulic pressure delivered from the master cylinder 20 is not delivered to the wheel cylinders 40.

Also, the hydraulic pressure delivered from the hydraulic pressure supply device 100 is delivered to the wheel cylinders 40 installed at the wheels FR and FL according to the opening of the first and fourth inlet valves 221a and 221d to generate a braking force. Further, the hydraulic pressure being delivered through the first and fourth inlet valves 221a and 221d is delivered to the wheel cylinders 40 of the rear left wheel RL and the rear right wheel RR through the first and second balance valves 241 and 242 which are opened. That is, by an opening operation of two selected inlet valves among the four inlet valves 221a, 221b, 221c, and 221d, the hydraulic pressure is supplied to all of the wheel cylinders 40.

Such an operation is an operation in a general braking state, and, when emergency braking is required, all of the inlet valves 221a, 221b, 221c, and 221d may be opened to rapidly deliver the hydraulic pressure to the wheel cylinders 40.

Meanwhile, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at a rear end of the simulation chamber 51 is opened so that oil filled in the simulation chamber 51 is delivered to the reservoir 30 through the simulator valve 54. Also, a reaction force piston 52 is moved, and pressure corresponding to a weight of a reaction force spring 53 supporting the reaction force piston 52 is generated inside the simulation chamber 51 to provide an appropriate pedal feeling to the driver.

Next, a case of releasing the braking force in the braking state established when the electric brake system 2 according to the second embodiment of the present disclosure operates normally will be described.

FIG. 10 is a hydraulic circuit diagram illustrating a state in which the electric brake system 2 according to the second embodiment of the present disclosure normally releases braking.

Referring to FIG. 10, when a pedal effort applied to the brake pedal 10 is released, the motor 120 generates a rotational force in a reverse direction compared to that of when a braking operation is performed to deliver the generated rotational force to the power conversion unit 130, and a worm shaft 131, a worm wheel 132, and a drive shaft 133 of the power conversion unit 130 are rotated in a reverse direction compared to that of when a braking operation is performed to move a hydraulic piston 112 backward to its original position, thereby releasing the pressure of the hydraulic pressure supply unit 110. Further, the hydraulic pressure supply unit 110 receives the hydraulic pressure delivered from the wheel cylinders 40 through the main hydraulic flow path 210 to deliver the received hydraulic pressure to the reservoir 30.

Meanwhile, opening and closing operation states of the first to fourth inlet valves 221a, 221b, 221c, and 221d, the first to fourth outlet valves 222a, 222b, 222c, and 222d, the first and second balance valves 241 and 242, and the first and second cut valves 261 and 262 are controlled the same way as they are in the braking operation. That is, the first to fourth outlet valves 222a, 222b, 222c, and 222d, and the second and third inlet valves 221b and 221c are closed, whereas the first and fourth inlet valves 221a and 221d are opened. As a result, the hydraulic pressure delivered from the wheel cylinders 40 of the first hydraulic circuit 201-1 is delivered into the pressure chamber 111 through the first balance valve 241 and the first inlet valve 221a, and the hydraulic pressure delivered from the wheel cylinders 40 of the second hydraulic circuit 202-1 is delivered into the pressure chamber 111 through the second balance valve 242 and the fourth inlet valve 221d.

Meanwhile, in the simulation device 50, the oil in the simulation chamber 51 is delivered to the master cylinder 20 according to the return of the reaction force piston 52 to its original position by means of the elastic force of the reaction force spring 53, and the oil is refilled in the simulation chamber 51 through the simulator valve 54 and a simulator check valve 55 which are connected to the reservoir 30 to ensure a rapid return of pressure of the pedal simulator.

Also, when the hydraulic piston 112 is moved through the hydraulic pressure supply device 100, an oil flow inside the pressure chamber 111 may be controlled through an oil flow path 114 and a connecting flow path 116 which are connected to the reservoir 30.

Further, the electric brake system 2 according to the second embodiment of the present disclosure may control the valves 221a, 221b, 221c, 221d, 222a, 222b, 222c, 222d, 241, and 242 provided at the hydraulic control unit 200-1 according to pressure required for the wheel cylinder 40 provided at each of the wheels RR, RL, FR, and FL of the two hydraulic circuits 201-1 and 202-1, thereby specifying and controlling a control range.

FIG. 11 is a hydraulic circuit diagram for describing a state in which an ABS is operated through the electric brake system 2 according to the second embodiment of the present disclosure.

FIG. 11 show a case of braking only a relevant wheel cylinder while the ABS is operated, and a state of braking only the wheels RL and FL is illustrated.

Referring to FIG. 11, the motor 120 is activated according to a pedal effort of the brake pedal 10, and a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure delivered from the master cylinder 20 is not delivered to the wheel cylinders 40.

Also, the first and third inlet valves 221a and 221c, the first to fourth outlet valves 222a, 222b, 222c, and 222d, and the first and second balance valves 241 and 242 are closed, and the hydraulic pressure delivered from the hydraulic pressure supply device 100 is not delivered to the right wheels RR and FR among the wheels RL, RR, FL, and FR. Further, the hydraulic pressure delivered from the hydraulic pressure supply device 100 is delivered to the wheel cylinder 40 of the rear left wheel RL through the second inlet valve 221b and to the wheel cylinder 40 of the front left wheel FL through the fourth inlet valve 221d. Consequently, the hydraulic pressure is delivered to only the left wheels RL and FL among the wheels RL, RR, FL, and FR.

That is, the electric brake system 2 according to the second embodiment of the present disclosure may independently control operations of the first to fourth inlet valves 221a, 221b, 221c, and 221d, the first to fourth outlet valves 222a, 222b, 222c, and 222d, and the first and second balance valves 241 and 242, thereby delivering the hydraulic pressure only to rear wheels RR and RL or only to wheel cylinders 40 that need a required hydraulic pressure among the front right wheel FR and the rear right wheel RR, the front right wheel FR and the rear left wheel RL, or the like.

FIG. 12 is a hydraulic circuit diagram for describing a state in which the electric brake system 2 of the second embodiment of the present disclosure operates in a dump mode.

The electric brake system 2 according to the second embodiment of the present disclosure may discharge only hydraulic pressure provided to relevant wheel cylinders 40 through the first to fourth outlet valves 222a, 222b, 222c, and 222d.

FIG. 12 shows the second and fourth inlet valves 221b and 221d, the first and third outlet valves 222a and 222c, and the first and second balance valves 241 and 242 being closed, and open states of the first and second inlet valves 221a, 221c, and the second and fourth outlet valves 222b and 222d. Therefore, the hydraulic pressure delivered from the wheel cylinders 40, which are installed at the rear left wheel RL and the front left wheel FL, is delivered to the reservoirs 30 through the second and fourth outlet valves 222b and 222d.

Meanwhile, the second and fourth outlet valves 222b and 222d may be opened to discharge the hydraulic pressure of the relevant wheel cylinders 40, and at the same time the first and third inlet valves 221a and 221c may be opened to supply the hydraulic pressure to the front right wheel FR and the rear right wheel RR.

As described above, each of the valves 221a, 221b, 221c, 221d, 222a, 222b, 222c, 222d, 241, and 242 of the hydraulic control unit 200-1 may be independently controlled to selectively deliver or remove the hydraulic pressure to or from the wheel cylinder 40 of each of the wheels RL, RR, FL, and FR such that a precise control of the hydraulic pressure may be possible Lastly, a case in which the electric brake system 2 operates abnormally will be described.

FIG. 13 is a hydraulic circuit diagram illustrating a state in which the electric brake system 2 according to the second embodiment of the present disclosure operates abnormally.

Referring to FIG. 13, when the electric brake system 2 operates abnormally, each of the valves 54, 221a, 221b, 221c, 221d, 222a, 222b, 222c, 222d, 241, 242, 261, and 262 is provided in an initial state of braking that is a non-operating state. When a driver pressurizes the brake pedal 10, an input rod 12 connected to the brake pedal 10 is moved forward (in a left direction of FIG. 13), and a first piston 21a which is in contact with the input rod 12 is moved forward (in the left direction of FIG. 13) at the same time that a second piston 22a is moved forward by means of the first piston 21a. At this point, because there is no gap between the input rod 12 and the first piston 21a, braking may be rapidly performed.

Further, the hydraulic pressure delivered from the master cylinder 20 is delivered to the wheel cylinders 40 through the first and second backup flow paths 251 and 252 that are connected for the purpose of backup braking to realize a braking force. At this point, the first and second cut valves 261 and 262 installed at the first and second backup flow paths 251 and 252 and the first and second balance valves 241 and 242 connected thereto are configured with a normally opened type solenoid valve, and the simulator valve 54, the first to fourth inlet valves 221a, 221b, 221c, and 221d, and the first to fourth outlet valves 222a, 222b, 222c, and 222d are configured with a normally closed type solenoid valve so that the hydraulic pressure is directly delivered to the wheel cylinders 40. Therefore, braking is stably realized to improve braking safety.

Next, referring to FIG. 14, a method capable of inspecting whether a leak occurs in the simulator valve 54 of the electric brake system 2 according to the second embodiment of the present disclosure will be described.

FIG. 14 is a hydraulic circuit diagram illustrating a state in which the electric brake system 2 according to the second embodiment of the present disclosure inspects whether a leak of a simulator valve occurs.

The electric brake system 2 according to the second embodiment of the present disclosure may further include an inspection valve 60 that is installed at one or more of the first and second backup flow paths 251 and 252 connected to the master cylinder 20. As one example, the inspection valve 60 may be installed between the first hydraulic port 24a of the master cylinder 20 and the simulation device 50 to control the hydraulic pressure delivered between the master cylinder 20 and the simulation device 50.

The inspection valve 60 may be configured with a normally opened type solenoid valve that is usually open and is closed when a closing signal is received. As one example, in a braking mode in which the driver applies a pedal effort to the brake pedal 10, the inspection valve 60 is maintained in an open state, and thus the hydraulic pressure delivered from the master cylinder 20 is delivered to the simulation device 50 so that the pedal effort is provided to the driver. In addition, the inspection valve 60 may be maintained in a closed state in an inspection mode to prevent the hydraulic pressure delivered from the hydraulic pressure supply device 100 from being delivered to the master cylinder 20.

The inspection mode is a mode that inspects whether a loss of pressure exists by generating hydraulic pressure at the hydraulic pressure supply device 100 to inspect whether a leak occurs in the simulator valve 54. At this point, when the hydraulic pressure delivered from the hydraulic pressure supply device 100 is delivered to the master cylinder 20, it is difficult to identify whether a leak occurs in the simulator valve 54 due to pressure being lost to the master cylinder 20 and the reservoir 30 being large.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, and the outlet valves 222a, 222b, 222c, and 222d are closed and thus the flow paths connecting the hydraulic pressure supply device 100 to the reservoirs 30 are closed so that the closed circuit may be configured.

In the electric brake system 2 according to the second embodiment of the present disclosure, the inspection valve 60 is installed at only the first backup flow path 251, which is connected to the simulation device 50, of the first and second backup flow paths 251 and 252. Therefore, it is necessary to prevent the hydraulic pressure delivered from the hydraulic pressure supply device 100 from being delivered to the master cylinder 20 through the second backup flow path 252. For this purpose, in the inspection mode, the second cut valve 262 or the third and fourth inlet valves 221c and 221d may be maintained in a closed state.

In the inspection mode, after the hydraulic pressure is generated in the hydraulic pressure supply device 100, it may be determined whether a loss of the hydraulic pressure occurs through a measurement by means of the backup flow path pressure sensor PS2. When the measurement result of the backup flow path pressure sensor PS2 indicates no occurrence of loss, a leak of the simulator valve 54 may be determined as not existing, and otherwise, when the measurement result thereof indicates the occurrence of loss, a leak may be determined as existing in the simulator valve 54.

Meanwhile, the inspection mode may be controlled to be executed when a vehicle is stopped or when it is determined that the driver has no intent to accelerate the vehicle. In the inspection mode, the hydraulic pressure generated in the hydraulic pressure supply device 100 is provided to the wheel cylinders 40 to generate a certain amount of the braking force. As a result, there is a problem in that acceleration intended by the driver is not realized due to the braking force which has been provided even when the driver steps on an accelerator pedal (not shown).

As one example, the inspection mode may be controlled to be executed when a predetermined time passes after the vehicle has been stopped, in a state in which a hand brake is currently operated, or when the driver applies a predetermined braking force to the vehicle.

Also, when it is determined that the driver has an intent to accelerate the vehicle in a state of the inspection mode, the hydraulic pressure of the wheel cylinders 40 may be rapidly eliminated. That is, when the driver activates the accelerator pedal in the state of the inspection mode, the hydraulic pressure supply device 100 may be operated in reverse to an operation performed in the state of the inspection mode so that the hydraulic pressure of the wheel cylinders 40 may be rapidly eliminated. At this point, the outlet valves 222 may also be opened to assist in releasing the hydraulic pressure of the wheel cylinders 40 to the reservoirs 30.

FIG. 15 is a hydraulic circuit diagram illustrating a non-braking state of an electric brake system 3 according to a third embodiment of the present disclosure, and FIG. 16 is a hydraulic circuit diagram illustrating a state in which it is inspected whether a leak occurs in a simulator valve 54 in the electric brake system 3 according to the third embodiment of the present disclosure.

The electric brake system 3 according to the third embodiment of the present disclosure may further include an inspection valve 60-1 that is installed at a flow path connecting a master cylinder 20 to a reservoir 30. As one example, the inspection valve 60-1 may control hydraulic pressure delivered between the reservoir 30 and the master cylinder 20 by being installed between the reservoir 30 and a camber, which is provided between a first piston 21a and a second piston 22a of the master cylinder 20. Also, the inspection valve 60-1 may control hydraulic pressure delivered between the reservoir 30 and a pressure chamber 111.

Referring to the drawings, an oil flow path 114 connected to the pressure chamber 111 may be connected at a middle of a flow path connecting the reservoir 30 and the master cylinder 20, and the inspection valve 60-1 may be provided between the reservoir 30 and a branching point of the oil flow path 114.

The inspection valve 60-1 may be configured with a normally opened type solenoid valve that is usually open and is closed when a closing signal is received.

As one example, the inspection valve 60-1 is maintained in an open state in a braking mode to deliver the hydraulic pressure between the reservoir 30 and the master cylinder 20 and at the same time allows the hydraulic pressure of the reservoir 30 to be delivered to the pressure chamber 111 when a hydraulic piston 112 of hydraulic pressure supply unit 110 is moved backward or returned to its original position.

In addition, the inspection valve 60-1 may be maintained in a closed state in an inspection mode to prevent the hydraulic pressure of the reservoir 30 from being delivered to the pressure chamber 111 of the hydraulic pressure supply unit 110.

The inspection mode is a mode that inspects whether a loss of pressure exists by generating hydraulic pressure at the hydraulic pressure supply device 100 to inspect whether a leak occurs in a simulator valve 54. When the hydraulic pressure delivered from the hydraulic pressure supply device 100 is delivered to the reservoir 30 and causes an occurrence of pressure loss, it is difficult to identify whether a leak occurs in the simulator valve 54.

Therefore, in the inspection mode, the inspection valve 60-1 may be closed and thus a hydraulic circuit connected to the hydraulic pressure supply device 100 may be configured as a closed circuit. That is, the inspection valve 60-1, the simulator valve 54, outlet valves 222, and a release valve 233 are closed and thus flow paths connecting the hydraulic pressure supply device 100 to the reservoir 30 are closed so that the closed circuit may be configured.

In the inspection mode, the electric brake system 3 according to the third embodiment may provide the hydraulic pressure only to a first backup flow path 251, which is connected to a simulation device 50, among first and second backup flow paths 251 and 252. Therefore, in the inspection mode, to prevent the hydraulic pressure delivered from the hydraulic pressure supply device 100 from being delivered to the master cylinder 20 through the second backup flow path 252, the second cut valve 262 or the second switching valve 232 may be maintained in a closed state.

The electric brake system 3 according to the third embodiment of the present disclosure may execute a drag reduction mode capable of reducing drag generation.

FIGS. 17 and 18 are hydraulic circuit diagrams illustrating a state in which a drag reduction mode is executed in the electric brake system 3 according to the third embodiment of the present disclosure.

In the drawings, a disc brake is shown as one example of the wheel cylinder 40. Hereinafter, the disc brake will be exemplified and described. However, a variety of brake devices such as a drum brake and the like may be included.

The disc brake forms a braking force by means of a friction force of a disc brake pad. This friction force is formed by the brake pad being pressurized due to an effect of hydraulic pressure that is formed through a manipulation of a driver with respect to a brake pedal 10, and the brake pad and a disc are separated from each other using a knock back phenomenon between the brake pad and the disc and a restoring force of a caliper piston to eliminate the friction force after braking is completed.

With such a method, however, a drag phenomenon in which the brake pad and the disc are not completely separated from each other frequently occurs, a lifespan of the brake pad is shortened due to unnecessary friction, output is degraded, and also fuel efficiency is decreased.

A drag reduction mode may be executed in a state in which a braking operation is not performed while a vehicle is running. Also, the drag reduction mode may be executed when the driver is expected to not have a braking intention for a short time. As one example, the drag reduction mode may be executed when the driver drives a vehicle in cruise control (when the driver drives the vehicle in a predetermined range of speed over a predetermined time).

Meanwhile, execution of the drag reduction mode may be controlled by an ECU. Also, the driver may manipulate a separate operating device to execute the drag reduction mode.

FIG. 17 shows a first drag reduction mode which is a process in which the hydraulic pressure supply device 100 is positively operated to deliver oil in the pressure chamber 111 to the reservoir 30. Here, the hydraulic pressure supply device 100 being positively operated refers to an operation for supplying hydraulic pressure.

In the first drag reduction mode, the inlet valves 221 are closed to prevent the hydraulic pressure provided from the hydraulic pressure supply device 100 from flowing into the wheel cylinders 40. Further, the first and second switching valves 231 and 232 and the first and second cut valves 261 and 262 are opened so that the hydraulic pressure provided from the hydraulic pressure supply device 100 is delivered to the master cylinder 20, and the inspection valve 60-1 is opened so that the oil in the master cylinder 20 is stored in the reservoir 30.

FIG. 18 shows a second drag reduction mode which is a process in which the hydraulic pressure supply device 100 is reversely operated to deliver oil inside the wheel cylinders 40 to the pressure chamber 111. Here, the hydraulic pressure supply device 100 being reversely operated refers to an operation for releasing the hydraulic pressure or forming negative pressure.

In the second drag reduction mode, the inlet valves 221 and the first and second switching valves 231 and 232 are opened so that the hydraulic pressure of the wheel cylinders 40 is delivered to the hydraulic pressure supply device 100. In the course of such an operation, drag of the wheel cylinders 40 may be reduced. Further, the first and second cut valves 261 and 262 are closed to prevent the hydraulic pressure of the wheel cylinders 40 from being delivered to the reservoir 30.

Also, in the second drag reduction mode, the inspection valve 60-1 is closed to prevent the hydraulic pressure of the reservoir 30 from being delivered to the hydraulic pressure supply device 100. That is, the inspection valve 60-1 installed at the flow path connecting the pressure chamber 111 to the reservoir 30 may be closed so that negative pressure of the hydraulic pressure supply device 100 may be used only to drain the hydraulic pressure of the wheel cylinders 40, thereby improving a drag reduction effect.

Meanwhile, in the electric brake system 3 according to the third embodiment of the present disclosure, when the pressure is rapidly released from the hydraulic pressure supply device 100, the inspection valve 60-1 installed at the flow path connecting the pressure chamber 111 to the reservoir 30 may be closed so that the oil inside the reservoir 30 may flow through the check valve 115 to prevent residual pressure from being generated therein.

Next, referring to FIGS. 19 and 20, a method capable of inspecting whether a leak occurs in a simulator valve 54 of an electric brake system 4 according to a fourth embodiment of the present disclosure will be described.

FIG. 19 is a hydraulic circuit diagram illustrating a non-braking state of the electric brake system 4 according to the fourth embodiment of the present disclosure, and FIG. 20 is a hydraulic circuit diagram illustrating a state in which it is inspected whether a leak occurs or not in a simulator valve 54 in the electric brake system 4 according to the fourth embodiment of the present disclosure.

The electric brake system 4 according to the fourth embodiment of the present disclosure may further include an inspection valve 60-1 that is installed at a flow path connecting a master cylinder 20 to a reservoir 30. As one example, the inspection valve 60-1 may control hydraulic pressure delivered between the reservoir 30 and the master cylinder 20 by being installed between the reservoir 30 and a camber, which is provided between a first piston 21a and a second piston 22a of the master cylinder 20. Also, the inspection valve 60-1 may control hydraulic pressure delivered between the reservoir 30 and a pressure chamber 111.

Referring to the drawings, an oil flow path 114 connected to the pressure chamber 111 may be connected at a middle of a flow path connecting the reservoir 30 and the master cylinder 20, and the inspection valve 60-1 may be provided between the reservoir 30 and a branching point of the oil flow path 114.

The inspection valve 60-1 may be configured with a normally opened type solenoid valve that is usually open and is closed when a closing signal is received.

As one example, the inspection valve 60-1 is maintained in an open state in a braking mode to deliver the hydraulic pressure between the reservoir 30 and the master cylinder 20, and at the same time allows the hydraulic pressure of the reservoir 30 to be delivered inside the pressure chamber 111 when a hydraulic piston 112 of the hydraulic pressure supply unit 110 is moved backward or returned to its original position.

In addition, the inspection valve 60-1 may be maintained in a closed state in an inspection mode to prevent the hydraulic pressure of the reservoir 30 from being delivered to the pressure chamber 111 of the hydraulic pressure supply unit 110.

The inspection mode is a mode that inspects whether a loss of pressure exists by generating hydraulic pressure at the hydraulic pressure supply device 100 to inspect whether a leak occurs in the simulator valve 54. When the hydraulic pressure delivered from the hydraulic pressure supply device 100 is delivered to the reservoir 30 and causes an occurrence of pressure loss, it is difficult to identify whether a leak occurs in the simulator valve 54.

Therefore, in the inspection mode, the inspection valve 60-1 may be closed and thus a hydraulic circuit connected to the hydraulic pressure supply device 100 may be configured as a closed circuit. That is, the inspection valve 60-1, the simulator valve 54, and outlet valves 222a, 222b, 222c, and 222d are closed and thus flow paths connecting the hydraulic pressure supply device 100 to the reservoir 30 are closed so that the closed circuit may be configured.

In the inspection mode, the electric brake system 4 according to the fourth embodiment may provide the hydraulic pressure only to a first backup flow path 251, which is connected to the simulation device 50, among first and second backup flow paths 251 and 252. Therefore, in the inspection mode, to prevent the hydraulic pressure delivered from the hydraulic pressure supply device 100 from being delivered to the master cylinder 20 through the second backup flow path 252, a second cut valve 262 may be maintained in a closed state.

The electric brake system 4 according to the fourth embodiment of the present disclosure may execute a drag reduction mode capable of reducing drag generation.

FIGS. 21 and 22 are hydraulic circuit diagrams illustrating a state in which a drag reduction mode is executed in the electric brake system 4 according to the fourth embodiment of the present disclosure.

FIG. 21 shows a first drag reduction mode which is a process in which the hydraulic pressure supply device 100 is positively operated to deliver oil inside the pressure chamber 111 to the reservoir 30. Here, the hydraulic pressure supply device 100 being positively operated refers to an operation for supplying hydraulic pressure.

In the first drag reduction mode, first and fourth inlet valves 221a and 221d and the first and second cut valves 261 and 262 may be opened to allow the hydraulic pressure generated in the hydraulic pressure supply device 100 to be delivered to the reservoir 30 through the first and second backup flow paths 251 and 252, and first and fourth outlet valves 222a and 222d may be opened to prevent hydraulic pressure passing through the first and fourth inlet valves 221a and 221d from being delivered to wheel cylinders 40.

Meanwhile, as shown in the drawings, second and third inlet valves 221b and 221c and first and second balance valves 241 and 242 are closed to prevent the hydraulic pressure from being delivered to the wheel cylinders 40 installed at rear wheels RL and RR.

FIG. 22 shows a second drag reduction mode which is a process in which the hydraulic pressure supply device 100 is reversely operated to deliver oil inside the wheel cylinders 40 to the pressure chamber 111. Here, the hydraulic pressure supply device 100 being reversely operated refers to an operation for releasing the hydraulic pressure or forming negative pressure.

In the second drag reduction mode, the first to fourth inlet valves 221a, 221b, 221c, and 221d and the first and second balance valves 241 and 242 are opened so that the hydraulic pressure of the wheel cylinders 40 rapidly is delivered to the hydraulic pressure supply device 100. In the course of such an operation, a drag of the wheel cylinders 40 may be reduced. Further, the first and second cut valves 261 and 262 and first to fourth outlet valves 222a, 222b, 222c, and 222d are closed to prevent the hydraulic pressure of the wheel cylinders 40 from being delivered to the reservoir 30.

Also, in the second drag reduction mode, the inspection valve 60-1 is closed to prevent the hydraulic pressure of the reservoir 30 from being delivered to the hydraulic pressure supply device 100. That is, the inspection valve 60-1 installed at the flow path connecting the pressure chamber 111 to the reservoir 30 may be closed so that negative pressure of the hydraulic pressure supply device 100 may be used only to drain the hydraulic pressure of the wheel cylinders 40, thereby improving a drag reduction effect.

Meanwhile, in the electric brake system 4 according to the fourth embodiment of the present disclosure, when the pressure is rapidly released from the hydraulic pressure supply device 100, the inspection valve 60-1 installed at the flow path connecting the pressure chamber 111 to the reservoir 30 may be closed so that the oil inside the reservoir 30 may flow through the check valve 115 to prevent residual pressure from being generated.

As is apparent from the above description, the electric brake system according to the embodiments of the present disclosure is capable of inspecting whether hydraulic pressure delivered from a hydraulic pressure supply device leaks or not by forming a closed circuit including the hydraulic pressure supply device, and, as a result, is capable of preventing hydraulic pressure delivered from a master cylinder from leaking in a backup mode with such an inspection.

Also, when pressure is released from the hydraulic pressure supply device, a reservoir may be blocked by operating an inspection valve so as to reduce a drag generated at a wheel cylinder.

In addition, when pressure is rapidly released from the hydraulic pressure supply device, an inspection valve is activated to block a reservoir so that residual pressure generated by delivering hydraulic pressure from the reservoir can be prevented from being generated.

| [Description of Reference Numerals] | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 221: Inlet Valve |
| 222: Outlet Valve | 231: First Switching Valve |
| 232: Second Switching Valve | 233: Release Valve |
| 241: First Balance Valve | 242: Second Balance Valve |
| 251: First Backup Flow Path | 252: Second Backup Flow Path |
| 261: First Cut Valve | 262: Second Cut Valve |

What is claimed is:

1. An electric brake system comprising:
a master cylinder configured to discharge oil according to a pedal effort of a brake pedal;
a simulation device provided with a simulator valve provided at a flow path connecting a simulation chamber, which is connected to the master cylinder to accommodate oil therein, to a reservoir for storing oil therein so as to provide a reaction force according to the pedal effort of the brake pedal; and
an inspection valve provided at a flow path connecting the master cylinder to a wheel cylinder,
wherein the simulator valve is provided to open the flow path connecting the simulation chamber to the reservoir in a normal mode, and to block the flow path connecting the simulation chamber to the reservoir in an abnormal mode, and
wherein the inspection valve is provided to open the flow path connecting the master cylinder to the simulation chamber in a braking mode, and to block the flow path connecting the master cylinder to the simulation chamber in an inspection mode.

2. The electric brake system of claim 1, further comprising:
a pedal displacement sensor configured to sense a displacement of the brake pedal;
a hydraulic pressure supply device configured to generate hydraulic pressure using a rotational force of a motor that is activated in response to an electrical signal output from the pedal displacement sensor;
a hydraulic control unit configured to deliver the hydraulic pressure delivered from the hydraulic pressure supply device to a wheel cylinder provided at each of wheels; and
an electronic control unit configured to control the motor and valves on the basis of hydraulic pressure information and displacement information of the brake pedal.

3. The electric brake system of claim 2, further comprising:
a backup flow path configured to connect the master cylinder to the hydraulic control unit and connected to a hydraulic flow path connected to the hydraulic pressure supply device; and
a cut valve provided at the backup flow path to control a hydraulic pressure flow,
wherein the cut valve is closed to deliver the hydraulic pressure delivered from the hydraulic pressure supply device to the wheel cylinder in the normal mode, and the cut valve is opened to deliver the hydraulic pressure delivered from the master cylinder to the wheel cylinder in the abnormal mode.

4. The electric brake system of claim 3, further comprising a pressure sensor provided at a lower side of the inspection valve of the backup flow path.

5. The electric brake system of claim 4, wherein the pressure sensor is provided between the inspection valve and a flow path branching to the simulation device.

6. The electric brake system of claim 4, wherein, in the inspection mode, the electronic control unit blocks the simulator valve and the inspection valve, generates hydraulic pressure at the hydraulic pressure supply device, and then measures pressure through the pressure sensor to determine whether the simulator valve leaks.

7. The electric brake system of claim 3, further comprising a pressure sensor provided at the backup flow path between the master cylinder and the simulation device.

8. The electric brake system of claim 7, wherein the pressure sensor is provided between the master cylinder of the backup flow path and a flow path branching to the simulation device.

9. The electric brake system of claim 1, wherein the inspection valve is a normally opened type solenoid valve that is usually open and is closed when a closing signal is received.

10. The electric brake system of claim 1, wherein the hydraulic pressure supply device includes:
a hydraulic supply pressure chamber connected to the reservoir through a hydraulic pressure supply oil flow path to store oil; and
a check valve installed at the hydraulic pressure supply oil flow path and configured to allow oil to flow from the reservoir to the hydraulic supply pressure chamber and to block the oil from flowing from the hydraulic supply pressure chamber to the reservoir.

11. The electric brake system of claim 10, wherein:
the hydraulic pressure supply oil flow path branches between the reservoir and the master cylinder; and
the inspection valve is provided between the reservoir and a branching point of the hydraulic pressure supply oil flow path.

12. The electric brake system of claim 1, wherein:
the flow path connecting the master cylinder to the wheel cylinder has a branch point connected to the simulation device, and
the inspection valve is arranged between the master cylinder and the branch point connected to the simulation device.

13. An electric brake system comprising:
a reservoir configured to store oil;
a master cylinder, in which a first hydraulic port and a second hydraulic port are formed, connected to the reservoir, provided with one or more pistons, and configured to discharge oil according to a pedal effort of a brake pedal;
a pedal displacement sensor configured to sense a displacement of the brake pedal;
a first backup flow path configured to connect the first hydraulic port to a wheel cylinder;
a second backup flow path configured to connect the second hydraulic port to a wheel cylinder;
a first cut valve provided at the first backup flow path to control an oil flow therein;
a second cut valve provided at the second backup flow path to control an oil flow therein;
a simulation device provided at a flow path branching from the first backup flow path, provided with a simulator valve provided at a flow path connecting a simulation chamber, which accommodates oil, to a reservoir, which stores oil, and configured to provide a reaction force according to the pedal effort of the brake pedal;
an inspection valve provided at the first backup flow path, wherein the inspection valve is provided at a middle of a flow path that branches to the first hydraulic port and the simulation device;
a hydraulic pressure supply device configured to generate hydraulic pressure using a rotational force of a motor that is activated in response to an electrical signal output from the pedal displacement sensor;
a pressure sensor provided between the inspection valve and a flow path branching to the simulation device;
a first hydraulic flow path connected to the hydraulic pressure supply device and connected to the first backup flow path;
a second hydraulic flow path connected to the hydraulic pressure supply device and connected to the second backup flow path;
a hydraulic control unit connected to the first and second hydraulic flow paths, configured to deliver the hydraulic pressure delivered from the hydraulic pressure supply device to a wheel cylinder provided at each of wheels, and including first and second hydraulic circuits respectively connected to different wheel cylinders; and
an electronic control unit configured to control the motor and valves on the basis of hydraulic pressure information and displacement information of the brake pedal,
wherein the simulator valve is provided to open a flow path connecting the simulation chamber to the reservoir in a normal mode, and to block the flow path connecting the simulation chamber to the reservoir in an abnormal mode, and
wherein the inspection valve is provided to open a flow path connecting the master cylinder to the simulation chamber in a braking mode, and to block the flow path connecting the master cylinder to the simulation chamber in an inspection mode.

14. The electric brake system of claim 13, wherein the hydraulic control unit includes:
a first inlet valve, a second inlet valve, a third inlet valve, and a fourth inlet valve which are provided at upstream sides of the wheel cylinders, respectively, to control the hydraulic pressure being delivered to the wheel cylinders provided at the wheels;
a first switching valve configured to control a connection between the hydraulic pressure supply device and the first and second inlet valves and provided at a flow path at which the hydraulic pressure supply device is connected to the first backup flow path; and
a second switching valve configured to control a connection between the hydraulic pressure supply device and the third and fourth inlet valves and provided at a flow path at which the hydraulic pressure supply device is connected to the second backup flow path.

15. The electric brake system of claim 13, wherein the hydraulic control unit includes:
a first inlet valve, a second inlet valve, a third inlet valve, and a fourth inlet valve which are provided at upstream sides of the wheel cylinders, respectively, to control the hydraulic pressure being delivered to the wheel cylinders installed at the wheels;

a first balance valve configured to control a connection between two wheel cylinders connected to the first inlet valve and the second inlet valve, respectively; and a second balance valve configured to control a connection between two wheel cylinders connected to the third inlet valve and the fourth inlet valve, respectively.

16. The electric brake system of claim 13, wherein the inspection valve is a normally opened type solenoid valve that is usually open and is closed when a closing signal is received.

17. The electric brake system of claim 13, wherein:

the first backup flow path has a branch point connected to the simulation device, and the inspection valve is arranged between the master cylinder and the branch point connected to the simulation device.

* * * * *